US011161247B2

United States Patent
Maeda

(10) Patent No.: US 11,161,247 B2
(45) Date of Patent: Nov. 2, 2021

(54) ROBOT TRAJECTORY GENERATION METHOD, ROBOT TRAJECTORY GENERATION APPARATUS, STORAGE MEDIUM, AND MANUFACTURING METHOD

(71) Applicant: CANON KABUSHIKI KAISHA, Tokyo (JP)

(72) Inventor: Yasuharu Maeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 304 days.

(21) Appl. No.: 16/243,949

(22) Filed: Jan. 9, 2019

(65) Prior Publication Data

US 2019/0143518 A1    May 16, 2019

Related U.S. Application Data

(63) Continuation of application No. 15/413,689, filed on Jan. 24, 2017, now Pat. No. 10,207,406.

(30) Foreign Application Priority Data

Jan. 25, 2016 (JP) ................................. 2016-011688

(51) Int. Cl.
*B25J 9/16* (2006.01)
*B25J 9/00* (2006.01)

(52) U.S. Cl.
CPC ........... *B25J 9/1666* (2013.01); *B25J 9/0087* (2013.01); *B25J 9/1676* (2013.01); *B25J 9/1682* (2013.01);
(Continued)

(58) Field of Classification Search
CPC ...... B25J 9/1666; B25J 9/0087; B25J 9/1682; B25J 9/1676; G05B 2219/39082;
(Continued)

(56) References Cited

U.S. PATENT DOCUMENTS 5,798,627 A * 8/1998 Gilliland ................ B25J 9/1671
318/568.13
6,004,016 A * 12/1999 Spector .................. B25J 9/1666
700/247

(Continued)

FOREIGN PATENT DOCUMENTS

JP    H05-119814 A    5/1993
JP    H08-036410 A    2/1996

*Primary Examiner* — Dale Moyer
(74) *Attorney, Agent, or Firm* — Canon U.S.A., Inc. IP Division

(57) ABSTRACT

An operation instruction list including starting points and ending points of trajectories of a plurality of robot arms is generated (a trajectory definition data generation process). Order of generation of trajectories is determined in accordance with the operation instruction list (a generation order determination process). A trajectory of a specific robot arm included in the operation instruction list is generated in accordance with a starting point and an ending point such that the trajectory avoids obstacle spaces registered in the obstacle memory when trajectories of other robot arms are generated (a trajectory generation process). A sweeping space in which a structure of the arm sweeps when the robot arm is operated along the generated trajectory is added to the obstacle memory as an obstacle space to be avoided by the other robot arm (an obstacle registration process).

18 Claims, 20 Drawing Sheets

(52) U.S. Cl.
CPC .............. *G05B 2219/39082* (2013.01); *G05B 2219/39135* (2013.01); *G05B 2219/40476* (2013.01)

(58) Field of Classification Search
CPC ........... G05B 2219/39135; G05B 2219/40476; G05B 2219/39083; G05B 2219/34348; G05B 2219/40477; G05B 2219/39136; G05B 2219/40492; G05B 2219/40478; G05B 2219/40479
See application file for complete search history.

(56) References Cited

U.S. PATENT DOCUMENTS

| | | | |
|---|---|---|---|
| 2005/0273200 A1* | 12/2005 | Hietmann | B25J 9/1666 700/248 |
| 2007/0150093 A1* | 6/2007 | Nagatsuka | G05B 19/41815 700/235 |
| 2008/0114492 A1* | 5/2008 | Miegel | B25J 9/1671 700/248 |
| 2009/0326711 A1* | 12/2009 | Chang | B25J 9/1666 700/248 |
| 2011/0054685 A1* | 3/2011 | Wada | B25J 9/1664 700/252 |
| 2012/0215351 A1* | 8/2012 | McGee | B25J 9/1666 700/248 |
| 2015/0251315 A1* | 9/2015 | Brandenberger | G01N 35/0099 700/255 |
| 2017/0028559 A1* | 2/2017 | Davidi | B25J 9/1682 |
| 2017/0129100 A1* | 5/2017 | Takeda | B25J 9/1605 |

* cited by examiner

FIG. 14

| INPUT OF OPERATION INSTRUCTION | | | | 1311 |
|---|---|---|---|---|

| ROBOT NAME | | ROBOT ARM A | | 1315 |
|---|---|---|---|---|
| OPERATION NAME | STARTING POINT | ENDING POINT | PRECEDING OPERATION | |
| Ma1 | Sa1 | Ga1 | - | |
| Ma2 | Sa2 | Ga2 | Ma1 | |
| Ma3 | Sa3 | Ga3 | Ma2 | |
| ADD NEW OPERATION 1317 | | | | |

| ROBOT NAME | | ROBOT ARM B | | 1316 |
|---|---|---|---|---|
| OPERATION NAME | STARTING POINT | ENDING POINT | PRECEDING OPERATION | |
| Mb1 | Sb1 | Gb1 | - | |
| Mb2 | Sb2 | Gb2 | Mb1 | |
| ADD NEW OPERATION 1317 | | | | |

| OBSTACLE MEMORY ~2201 | |
|---|---|
| OBSTACLE NAME (2203) | SHAPE DATA (2204) |
| OBSTACLE 7 | ### |

FIG. 15B

| OBSTACLE MEMORY ~2201 | |
|---|---|
| OBSTACLE NAME (2203) | SHAPE DATA (2204) |
| OBSTACLE 7 | ### |
| SVa | ###### |

FIG. 15C

| OBSTACLE MEMORY ~2201 | |
|---|---|
| OBSTACLE NAME (2203) | SHAPE DATA (2204) |
| OBSTACLE 7 | ### |
| SVa | ###### |
| SVb | ##### |

FIG. 16A

| OBSTACLE MEMORY 2201 | |
|---|---|
| OBSTACLE NAME | SHAPE DATA |
| OBSTACLE 7 | ### |

| OBSTACLE MEMORY 2201 | |
|---|---|
| OBSTACLE NAME | SHAPE DATA |
| OBSTACLE 7 | ### |
| SVa1 | ###### |

| OBSTACLE MEMORY 2201 | |
|---|---|
| OBSTACLE NAME | SHAPE DATA |
| OBSTACLE 7 | ### |
| SVa1 | ###### |
| SVb1 | ##### |

| OBSTACLE MEMORY | — 2201 |
| --- | --- |
| OBSTACLE NAME | SHAPE DATA |
| OBSTACLE 7 | ### |
| 2203 | 2204 |

FIG. 16E

| OBSTACLE MEMORY | — 2201 |
| --- | --- |
| OBSTACLE NAME | SHAPE DATA |
| OBSTACLE 7 | ### |
| SVa2 | ###### |
| 2203 | 2204 |

FIG. 16F

| OBSTACLE MEMORY | — 2201 |
| --- | --- |
| OBSTACLE NAME | SHAPE DATA |
| OBSTACLE 7 | ### |
| SVa2 | ###### |
| SVb2 | ##### |
| 2203 | 2204 |

FIG. 17A

| OBSTACLE MEMORY | 2201 |
|---|---|
| OBSTACLE NAME | SHAPE DATA |
| OBSTACLE 7 | ### |
| ROBOT ARM 5  ORIENTATION OF Sa1 | #### |
| ROBOT ARM 5  ORIENTATION OF Ga1 | #### |
| ROBOT ARM 5  ORIENTATION OF Ga2 | #### |
| ROBOT ARM 5  ORIENTATION OF Ga3 | #### |
| ROBOT ARM 6  ORIENTATION OF Sb1 | #### |
| ROBOT ARM 6  ORIENTATION OF Gb1 | #### |
| ROBOT ARM 6  ORIENTATION OF Gb2 | #### |

| OBSTACLE MEMORY | 2201 |
|---|---|
| OBSTACLE NAME | SHAPE DATA |
| OBSTACLE 7 | ### |
| ROBOT ARM 5  ORIENTATION OF Sa1 | #### |
| ROBOT ARM 5  ORIENTATION OF Ga1 | #### |
| ROBOT ARM 5  ORIENTATION OF Ga2 | #### |
| ROBOT ARM 5  ORIENTATION OF Ga3 | #### |
| ROBOT ARM 6  ORIENTATION OF Sb1 | #### |
| ROBOT ARM 6  ORIENTATION OF Gb1 | #### |
| ROBOT ARM 6  ORIENTATION OF Gb2 | #### |
| SVa1 | ##### |

| OBSTACLE MEMORY | 2201 |
|---|---|
| OBSTACLE NAME | SHAPE DATA |
| OBSTACLE 7 | ### |
| ROBOT ARM 5  ORIENTATION OF Sa1 | #### |
| ROBOT ARM 5  ORIENTATION OF Ga1 | #### |
| ROBOT ARM 5  ORIENTATION OF Ga2 | #### |
| ROBOT ARM 5  ORIENTATION OF Ga3 | #### |
| ROBOT ARM 6  ORIENTATION OF Sb1 | #### |
| ROBOT ARM 6  ORIENTATION OF Gb1 | #### |
| ROBOT ARM 6  ORIENTATION OF Gb2 | #### |
| SVa1 | ##### |
| SVa2 | #### |

| OBSTACLE MEMORY | 2201 |
|---|---|
| OBSTACLE NAME | SHAPE DATA |
| OBSTACLE 7 | ### |
| ROBOT ARM 5 ORIENTATION OF Sa1 | ### |
| ROBOT ARM 5 ORIENTATION OF Ga1 | ### |
| ROBOT ARM 5 ORIENTATION OF Ga2 | ### |
| ROBOT ARM 5 ORIENTATION OF Ga3 | ### |
| ROBOT ARM 6 ORIENTATION OF Sb1 | ### |
| ROBOT ARM 6 ORIENTATION OF Gb1 | ### |
| ROBOT ARM 6 ORIENTATION OF Gb2 | ### |
| SVa1 | ##### |
| SVa2 | ### |
| SVa3 | ##### |
| 2203 | 2204 |

FIG. 17E

| OBSTACLE MEMORY | 2201 |
|---|---|
| OBSTACLE NAME | SHAPE DATA |
| OBSTACLE 7 | ### |
| ROBOT ARM 5 ORIENTATION OF Sa1 | ### |
| ROBOT ARM 5 ORIENTATION OF Ga1 | ### |
| ROBOT ARM 5 ORIENTATION OF Ga2 | ### |
| ROBOT ARM 5 ORIENTATION OF Ga3 | ### |
| ROBOT ARM 6 ORIENTATION OF Sb1 | ### |
| ROBOT ARM 6 ORIENTATION OF Gb1 | ### |
| ROBOT ARM 6 ORIENTATION OF Gb2 | ### |
| SVa1 | ##### |
| SVa2 | ### |
| SVa3 | ##### |
| SVb1 | ### |
| 2203 | 2204 |

FIG. 17F

| OBSTACLE MEMORY | 2201 |
|---|---|
| OBSTACLE NAME | SHAPE DATA |
| OBSTACLE 7 | ### |
| ROBOT ARM 5 ORIENTATION OF Sa1 | ### |
| ROBOT ARM 5 ORIENTATION OF Ga1 | ### |
| ROBOT ARM 5 ORIENTATION OF Ga2 | ### |
| ROBOT ARM 5 ORIENTATION OF Ga3 | ### |
| ROBOT ARM 6 ORIENTATION OF Sb1 | ### |
| ROBOT ARM 6 ORIENTATION OF Gb1 | ### |
| ROBOT ARM 6 ORIENTATION OF Gb2 | ### |
| SVa1 | ##### |
| SVa2 | ### |
| SVa3 | ##### |
| SVb1 | ### |
| SVb2 | ### |
| 2203 | 2204 |

ROBOT TRAJECTORY GENERATION METHOD, ROBOT TRAJECTORY GENERATION APPARATUS, STORAGE MEDIUM, AND MANUFACTURING METHOD

CROSS-REFERENCE TO RELATED APPLICATIONS

This application is a Continuation of U.S. patent application Ser. No. 15/413,689, filed Jan. 24, 2017, which claims the benefit of Japanese Patent Application No. 2016-011688, filed Jan. 25, 2016, both of which are hereby incorporated by reference herein in their entirety.

BACKGROUND OF THE INVENTION

Field of the Invention

The present invention relates to a robot trajectory generation method for generating trajectories for operating a plurality of robot arms arranged in a common working area by a control apparatus, a robot trajectory generation apparatus, a product fabrication method, a recording medium, a program, and a robot system.

Description of the Related Art

In recent years, robot apparatuses such as industrial robots which perform assembly, processing, conveying, coating, paint application, and the like have been widely used in production lines of industrial products. In such a production line, a plurality of robot apparatuses are closely arranged so that production capacity is improved and space saving is attained. Furthermore, the plurality of robot apparatuses may simultaneously or cooperatively operate in an inside of a common working area. In the case where a plurality of robot apparatuses are operated in a common working area as described above, occurrence of interference (contact or collision) among robot arms is to be prevented.

An operation of inputting robot trajectories for changing positions and orientations of robot arms while robot apparatuses are moved and checked in an actual working environment by an operation apparatus which is called as a "teaching pendant" is performed as teaching of robot operations. Furthermore, a robot programing method for performing 3D virtual display of a working area of the robot apparatuses using a display apparatus of a robot control terminal and inputting trajectories while the robot apparatuses are operated in this virtual environment may be used. In robot teaching using such a virtual environment, an input unit, such as a keyboard, a pointing device, or a touch panel, is used to input teaching points for control of the robot apparatuses instead of the teaching pendant.

In the robot teaching (programming) in the related art including a manual operation process performed by a teaching person as described above, the teaching person performs a teaching process through a trial and error process, taking paths, trajectories, and timings for operating the robots into consideration, so that interference does not occur among robots. Therefore, in such a general method which considerably depends on the manual operation of the teaching person, as the number of robots and the total number of operations are increased, it is difficult to secure trajectories which do not cause interference between the robots, and a long period of time is required for a teaching operation. Furthermore, in a case where facilities near the production line or arrangement of the robots is to be changed, the same teaching operation is naturally required to be performed again.

To address this problem, a technique of automatically generating paths (trajectories) which do not cause interference between robots has been studied in recent years. As a method for such a path generation, path generation algorithms, such as a rapidly exploring random tree (RRT) and a probabilistic roadmap method (PRM), have been proposed. When such a trajectory/path generation technique is used, a teaching person only specifies a starting point and an ending point of a robot operation, and therefore, a burden of a teaching operation may be reduced. Furthermore, the path generation may be executed by a computer calculation in a virtual space for simulation of a working environment, and therefore, paths which do not cause interference may be calculated again within a short period of time even if facilities near a production line and arrangement of robots are changed.

Furthermore, in addition to the generation of paths which do not cause interference with obstacles in a working environment for one robot, a technique of generating robot trajectories which do not cause interference among a plurality of robots in which positions and orientations are changed by the minute in the working environment has also been proposed.

For example, in Japanese Patent Laid-Open No. 8-166809, interference between robots is avoided by controlling timings when operations of the robots are started. As a method for avoiding interference among a plurality of robots disclosed in Japanese Patent Laid-Open No. 8-166809, priority order of the operations of the robots is set and robot passing expectation regions of the robots which operate within a predetermined period of time or occupied regions which are larger regions including the robot passing expectation regions are successively calculated. Thereafter, it is determined whether calculated occupied regions overlap with each other. When the determination is affirmative, one of the robots, that is, a first robot, having a lower priority level is brought into a standby state and the other of the robots, that is, a second robot, having a higher priority level is operated. Furthermore, portions in the occupied region of the second robot in which an operation is terminated while the other robot is operated are successively released. Operation of the first robot is started only after the overlap is not detected in accordance with the change of the occupied region of the second robot.

Furthermore, in "On delaying collision checking in PRM planning: Application to multi-robot coordination" G. Sanchez and J.-C. Latombe, International Journal of Robotics Research, vol. 21, no. 1, pp. 5 to 26, 2002, interference between robots is avoided by controlling speeds of the robots at a time of robot operation. In trajectory generation in "On delaying collision checking in PRM planning: Application to multi-robot coordination" G. Sanchez and J.-C. Latombe, International Journal of Robotics Research, vol. 21, no. 1, pp. 5 to 26, 2002, a path from a starting point to an ending point of each robot is calculated while other robots are seen not to exist, and thereafter, a graph using positions on the paths of the robots as parameters is generated. Subsequently, the graph is searched for a combination of positions on the paths of the robots which do not interfere with each other and the paths obtained first and the combination of the positions on the paths of the robots are combined with each other so that trajectories which do not interfere with each other and which correspond to the operation with the controlled speed are obtained.

The trajectory control disclosed in Japanese Patent Laid-Open No. 8-166809 and the trajectory control disclosed in "On delaying collision checking in PRM planning: Application to multi-robot coordination" G. Sanchez and J.-C. Latombe, International Journal of Robotics Research, vol. 21, no. 1, pp. 5 to 26, 2002 are performed on the assumption of synchronization control. For example, in any of the trajectory control, trajectories which do not interfere with each other between robots are generated by synchronously controlling and adjusting speeds of operations of the robots and timings when the robots are operated after paths/trajectories of the robots are determined.

However, even when the trajectory control described above is executed, a region in which a robot passes at a certain time point may overlap with a region in which another robot passes at another time point. Specifically, since the robots are controlled in a time axis so as not to interfere with each other in the general techniques described above, if operation speeds or operation timings of the robots shift in a real environment, interference between robot arms may occur. In a case where one of the plurality of robots is erroneously stopped in a common passing region or an actual speed of an operation of one of the plurality of robots is considerably different from an ideal speed, for example, the robots may interfere with each other.

Furthermore, the general trajectory control described above is a technique of performing control such that a plurality of robots do not occupy the same space at a certain time point and requires calculations relating to a space axis and a time axis. Accordingly, a calculation load of a processing system is generally large, and significant calculation resources may be required.

SUMMARY OF THE INVENTION

Accordingly, the present invention considerably reduces possibility of overlap between passing regions of a plurality of robot arms in a reliable manner irrespective of operation speeds of the robot arms in a real environment and accuracy of timing control in generation of robot trajectories. Furthermore, even a control apparatus operating at a low speed may perform trajectory generation at high speed.

According to an embodiment of the present invention, a robot control method arranged to generate trajectories for operating a plurality of robot arms, which are installed in the same working area, by a control device includes generating an operation instruction list which stores trajectory definition data including starting points and ending points of the trajectories of the plurality of robot arms to be generated, determining a trajectory generation order of trajectory generation in accordance with the plurality of trajectory definition data included in the generated operation instruction list, generating trajectories for operating the robot arms such that the trajectories avoid obstacle spaces other than an obstacle space registered for a specific one of the robot arms among obstacle spaces registered in an obstacle memory in accordance with the trajectory definition data associated with the robot arm included in the operation instruction list based on the determined trajectory generation order, registering a sweeping space, in which a structure of the robot arm sweeps, in the obstacle memory as an obstacle space to be avoided by the robot arms other than the robot arm when the robot arm is operated along the generated trajectory, and controlling the operation of the plurality of robot arms based on the generated trajectories.

With this configuration, possibility that passing regions of a plurality of robot arms overlap with each other may be reliably reduced irrespective of operation speeds of the robot arms in a real environment and accuracy of timing control in generation of robot trajectories. Furthermore, with this configuration, high-speed trajectory generation may be performed even when a low-speed control device is used since calculation and control associated with a time axis are not used when the robot arms avoid obstacles.

Further features of the present invention will become apparent from the following description of exemplary embodiments with reference to the attached drawings. Each of the embodiments of the present invention described below can be implemented solely or as a combination of a plurality of the embodiments or features thereof where necessary or where the combination of elements or features from individual embodiments in a single embodiment is beneficial.

BRIEF DESCRIPTION OF THE DRAWINGS

FIG. 14 is a diagram illustrating a user interface used to input an operation instruction available in the robot trajectory generation system in FIG. 1.

FIGS. 15A to 15C are diagrams illustrating transition of content of data in an obstacle memory according to the first embodiment.

FIGS. 16A to 16F are diagrams illustrating transition of content of data in an obstacle memory according to the second embodiment.

FIGS. 17A to 17F are diagrams illustrating transition of content of data in an obstacle memory according to the third embodiment.

DESCRIPTION OF THE EMBODIMENTS

Hereinafter, embodiments of the present invention will be described with reference to the accompanying drawings. Note that the embodiments described hereinafter are merely examples and detailed configurations may be appropriately modified by those skilled in the art without departing from the scope of the present invention. Furthermore, numerical numbers described in the embodiments below are merely reference numerical numbers and do not limit the present invention.

Note that a "robot" in this specification may have any configuration as long as the robot is controlled and operated by a power source, such as a motor, and the basic configuration does not limit the present invention. In the embodiments below, a trajectory generation method and a trajectory generation apparatus of a robot according to the present invention will be described taking an articulated robot arm of a vertical serial link type having rotary joints as an example. However, the present invention may also be embodied in a case where a plurality of articulated parallel link robots or a plurality of robots which move on a flat plane are arranged in a working environment and trajectories of the robots are generated.

First Embodiment

Figure 1:
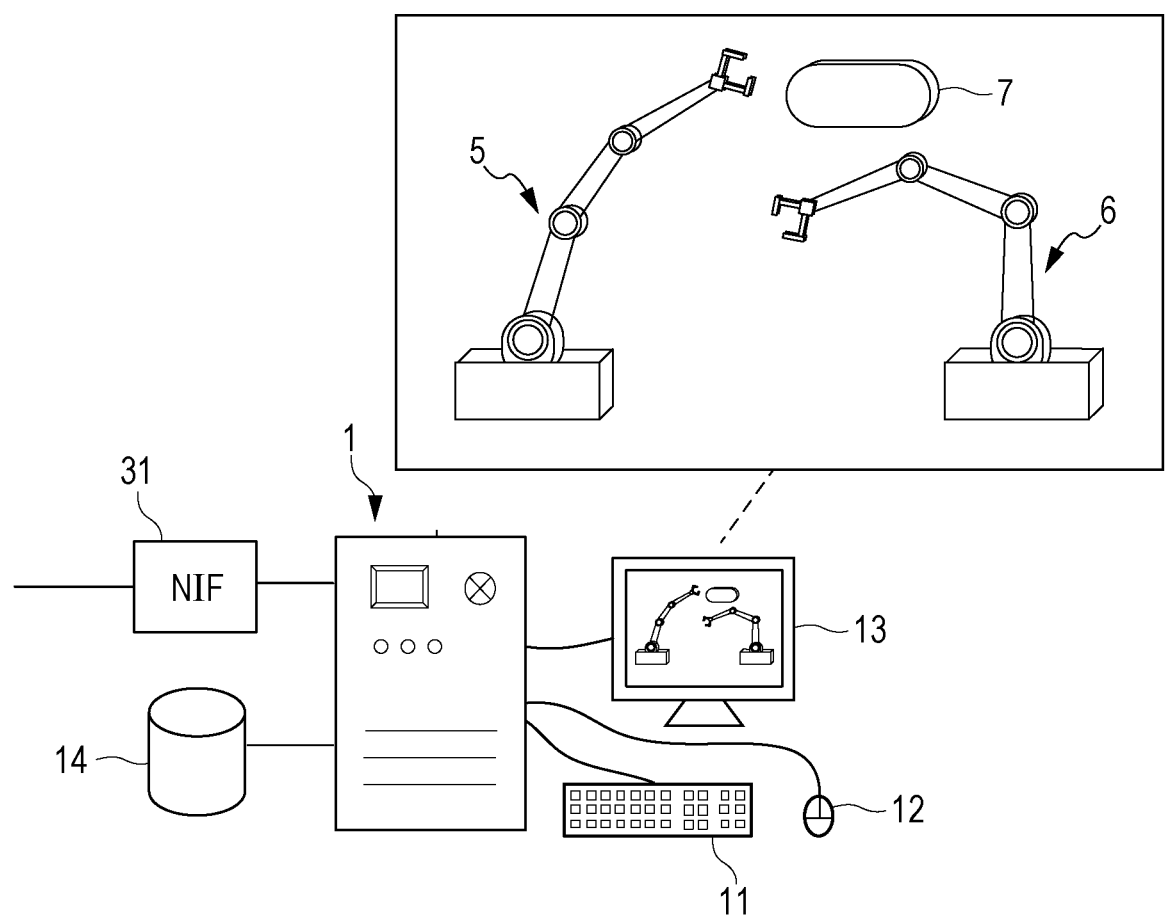
FIG. 1 is a diagram illustrating a configuration of a robot trajectory generation system according to an embodiment of the present invention.
Figure 2:
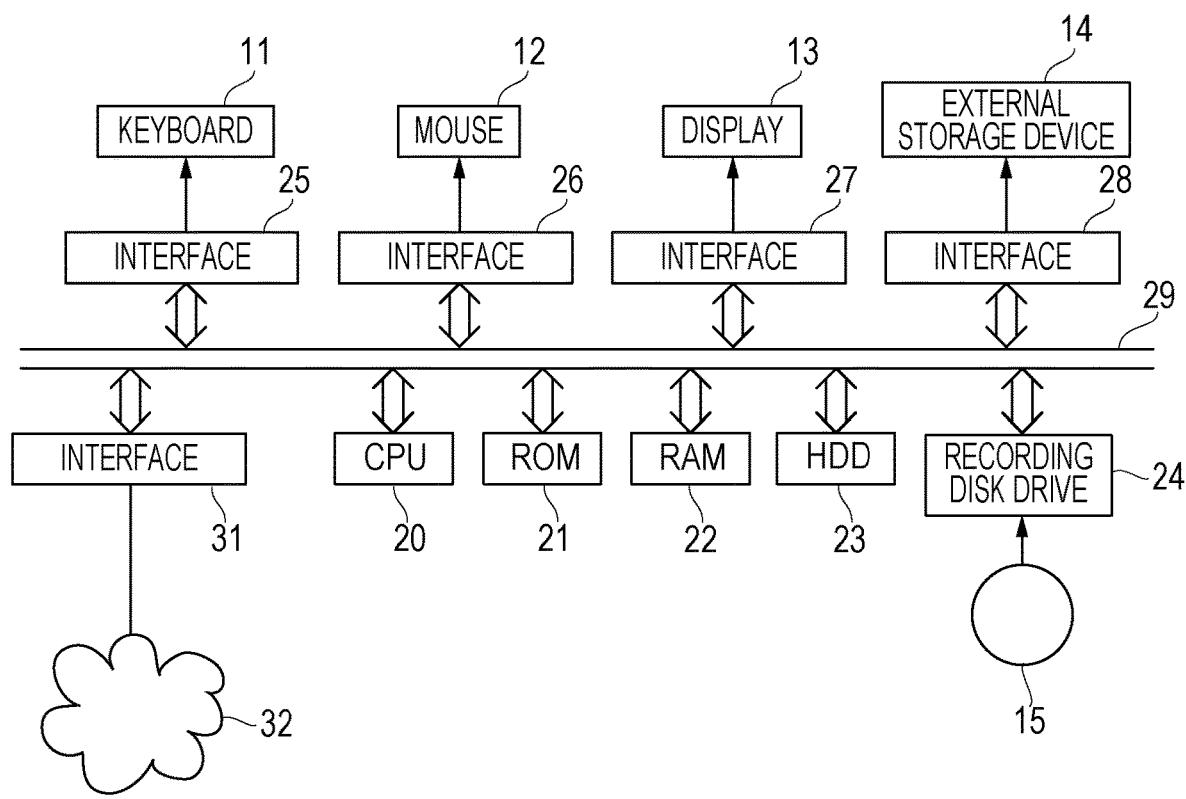
FIG. 2 is a block diagram illustrating a configuration of a control system of a trajectory generation apparatus according to a first embodiment.

FIGS. 1 and 2 are diagrams illustrating a configuration of a robot system including a robot trajectory generation system according to a first embodiment of the present invention. FIG. 1 is a diagram illustrating a configuration of the entire robot system including the robot trajectory generation system. In FIG. 1, a calculation processing unit 1 may be configured by hardware, such as a personal computer (PC), for example. A keyboard 11 and a mouse 12 (or a pointing device, such as a track pad) to be used by an operator (a robot teaching person) to input an operation instruction are connected to the calculation processing unit 1 as an input unit. Furthermore, a display 13 serving as a display device to be used by the operator to check an input operation instruction and robot trajectories generated based on the operation instruction is connected to the calculation processing unit 1.

An external storage device 14, a network interface 31, and the like may be connected to the calculation processing unit 1. The external storage device 14 of FIG. 1 is mainly configured by a disk device, such as a hard disk drive (HDD) or a solid state drive (SSD) which is externally provided, or various optical disks. The network interface 31 is used to transfer operation instruction data to a robot arm of a real machine.

Furthermore, the external storage device 14 and the network interface 31 may be used as an installation/update unit for installing a robot trajectory generation program to be described below in the calculation processing unit 1 and updating the installed program. In this case, the external storage device 14 may be configured by a media exchangeable optical disk device, for example. A control program which embodies the present invention may be installed in the calculation processing unit 1 through the optical disk described above and may be updated. Similarly, the control program which embodies the present invention may be installed into the calculation processing unit 1 using a predetermined network protocol through the network interface 31 and may be updated.

The robot trajectory generation apparatus of FIG. 1 generates trajectories of a plurality of robot arms 5 and 6 (two robot arms in this case) installed in the same working environment, for example. An obstacle 7 not to interfere with or collide with the robot arms 5 and 6 may be disposed in the working environment of the robot arms 5 and 6. The obstacle 7 may be any object disposed in the working environment other than the robot arms 5 and 6, such as a part supply device, a ventilation duct, or a case of the calculation processing unit 1. In trajectory generation control to be described below, robot trajectories are generated such that the robot arms 5 and 6 do not interfere with the obstacle 7 or the robot arms 5 and 6 do not interfere with each other.

The operator (a robot administrator, a robot programmer, or the like) inputs operation instructions for the robot arms 5 and 6 through user interfaces displayed on the display 13 using the keyboard 11, the mouse 12, or the like (input of trajectory definition data). Examples of the user interfaces displayed as graphics on the display 13 include dialog display illustrated in FIG. 14 described below and a GUI displayed as 3D virtual display described below. In the operation instruction input of this embodiment, the operator inputs trajectory definition data including (3D coordinates of) a starting point and an ending point of a trajectory to be generated, for example.

The calculation processing unit 1 generates an operation instruction list including the trajectory definition data in accordance with the input operation instruction input and generates trajectories of the robot arms 5 and 6 in accordance with the operation instruction list.

Note that the robot trajectory generation apparatus of FIG. 1 may be connected to robot arms of the real machine which are targets of trajectory generation and may generate robot trajectories even in an offline environment in which the robot trajectory generation apparatus is not connected to any robot arm. In the robot trajectory generation in the offline environment, the robot arms 5 and 6 which are program targets are virtually displayed on the display 13 in a 3D manner. Such a 3D virtual display GUI enables operation of arms and joints virtually displayed on the display 13 using the keyboard 11, the mouse 12, or the like.

By using the virtual environment, (positions and orientations in) the starting point and the ending point of the robot trajectory may be input by operating the robot arms 5 and 6 which are virtually displayed, instead of the dialog display described below (refer to FIG. 14 described below, for example). Furthermore, in this virtual environment, an operation of changing arrangement of robot arms and an obstacle in a virtual space may be performed where appropriate.

FIG. 2 is a block diagram illustrating a configuration of a control system of the calculation processing unit 1. In the configuration of FIG. 2, a central processing unit (CPU) 20, a read only memory (ROM) 21, a random access memory (RAM) 22, and a hard disk drive (HDD) 23 (incorporated in the case of the calculation processing unit 1, for example) are connected to a system bus 29.

The external storage device 14 of FIG. 1 is connected to the system bus 29 through an interface 28. Although the optical disk device is particularly illustrated as a member constituting the external storage device 14 in FIG. 1, such a disk device is illustrated as a recording disk drive 24 in FIG. 2. The recording disk drive 24 may read data included in a recording disk 15 of a format of various optical disks and write data in the recording disk 15. Accordingly, the recording disk 15 may be used for input and output of a control program which embodies the present invention, for example. In this case, the recording disk 15 is a recording medium from which the control program may be read.

The keyboard 11, the mouse 12, and the display 13 illustrated in FIG. 1 are connected to the system bus 29 through interfaces 25, 26, and 27, respectively. The network interface 31 controls communication between an external network 32 and the system bus 29. In this communication, TCP/IP or various communication protocols executed on the TCP/IP may be used.

A trajectory generation program described below may be executed on an operating system (OS) operating in the calculation processing unit 1 described above, for example. Depending on a configuration of the OS, a virtual storage unit which uses a storage region, such as the HDD 23, may be used. In this case, a region, such as an obstacle memory described below, may be secured in the virtual storage unit (such as the HDD 23) in addition to a main storage device, such as the RAM 22.

Figure 4:
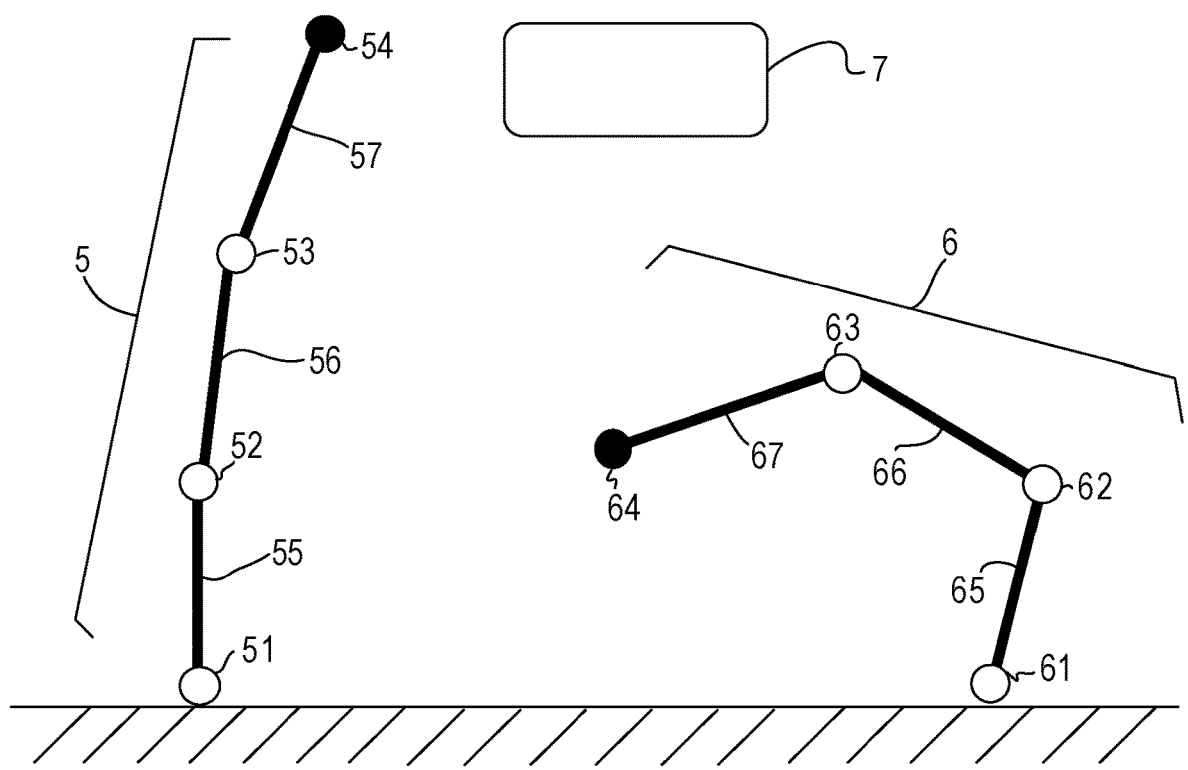
FIG. 4 is a diagram illustrating two robot arms according to the first embodiment.

FIG. 4 is a diagram schematically illustrating a configuration of the working environment including the robot arms 5 and 6 which are trajectory generation targets of this embodiment and the obstacle 7. For simplicity of the description, the robot arms 5 and 6 are simply configured. For example, each of the robot arms 5 and 6 in FIG. 4 has three joints. Note that, for convenience of description of control, the robot arms 5 and 6 are indicated by alphabets of A and B, respectively, where appropriate hereinafter.

The robot arm 5 includes three links 55, 56, and 57 and joint shafts 51, 52, and 53 which connect the links. The link 57 has a tip end having an end effector 54, such as a robot hand. The robot arm 6 includes links 65, 66, and 67, joint shafts 61, 62, and 63, and an end effector 64. Each of the three joint shafts of the robot arms 5 and 6 has a rotation driving mechanism, and positions of the end effectors 54 and 64 disposed on the tip ends of the robot arms 5 and 6 are determined by rotation angles.

The rotation driving mechanisms of the joint shafts of the robot arms 5 and 6 have driving systems including servo motors and reduction gears and may control the rotation angles based on robot control data. For example, control conditions, such as opening angles of fingers of the end effectors 54 and 64, such as robot hands, may be similarly controlled through the driving systems including servo motors and reduction gears. With this configuration, by transmitting the robot control data to the robot arms 5 and 6, the robot arms 5 and 6 may be controlled to be in specific positions and orientations and the end effectors 54 and 64 may perform specific operations. Although a driving source, such as a servo motor, is illustrated above, the joints and the end effectors may not be electrically controlled to be driven. For example, the joints and the end effectors of the robot arms 5 and 6 may be driven by air pressure controlled by the robot control data or air pressure and oil pressure of an oil pressure actuator.

As illustrated in FIG. 4, the robot arms 5 and 6 are closely disposed in the working environment and the obstacle 7 is included in the working environment. Therefore, it is likely that interference may be generated among the links, the joint shafts, and the end effectors of the robot arms depending on angles of the joint shafts of the two robot arms. In the trajectory generation control described below, robot trajectories are generated such that the robot arms 5 and 6 do not interfere with each other. In this case, robot trajectories are generated such that the robot arms 5 and 6 also do not interfere with the obstacle 7. Then the robot control data is transmitted to the robot arms 5 and 6 so that the robot arms 5 and 6 are driven along the generated trajectories. In this way, the arms may be controlled to be in specific positions and orientations, the end effectors 54 and 64 may perform specific operations of assembling parts and processing parts so that a product is fabricated.

Hereinafter, a robot trajectory generation, in particular, a method for generating robot trajectories such that passing regions of a plurality of robots do not overlap with each other will be described with reference to FIGS. 3, 5, 6A, 6B, 6C, 14, 15A, 15B, and 15C.

Figure 3:
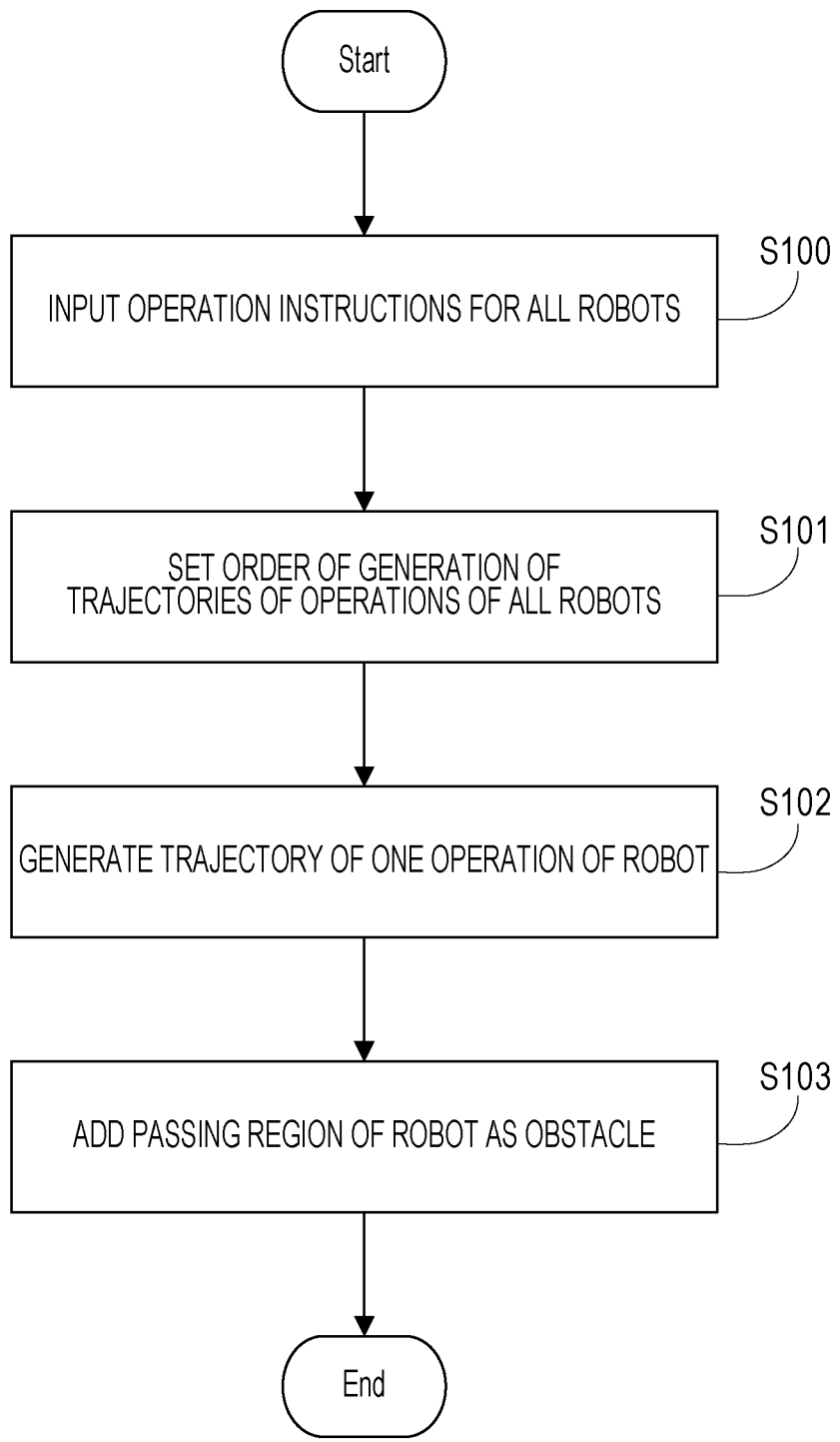
FIG. 3 is a flowchart schematically illustrating a flow of trajectory generation control according to the first embodiment to a third embodiment.
Figure 5:
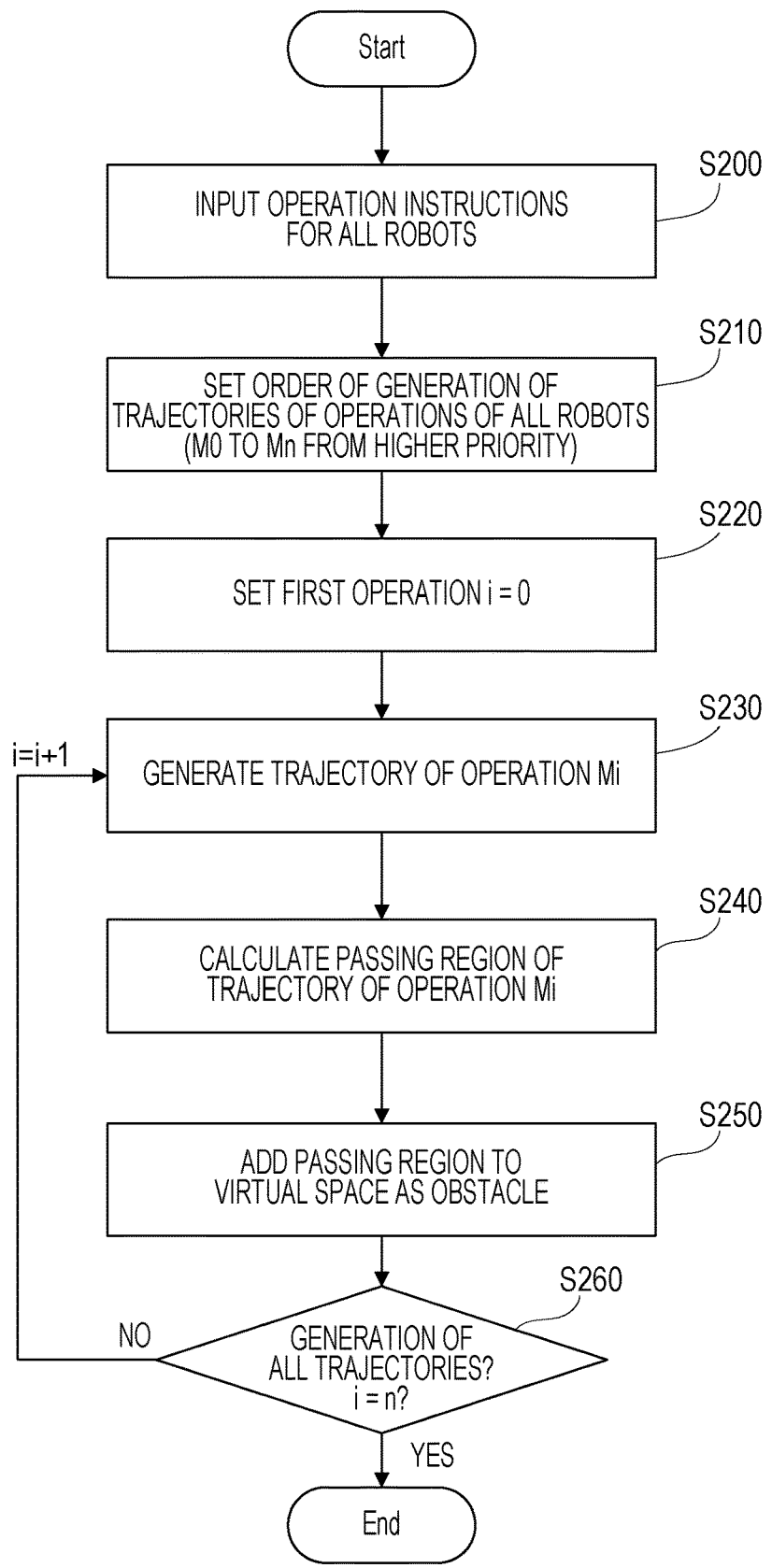
FIG. 5 is a flowchart illustrating the trajectory generation control according to the first embodiment.
Figure 6A:
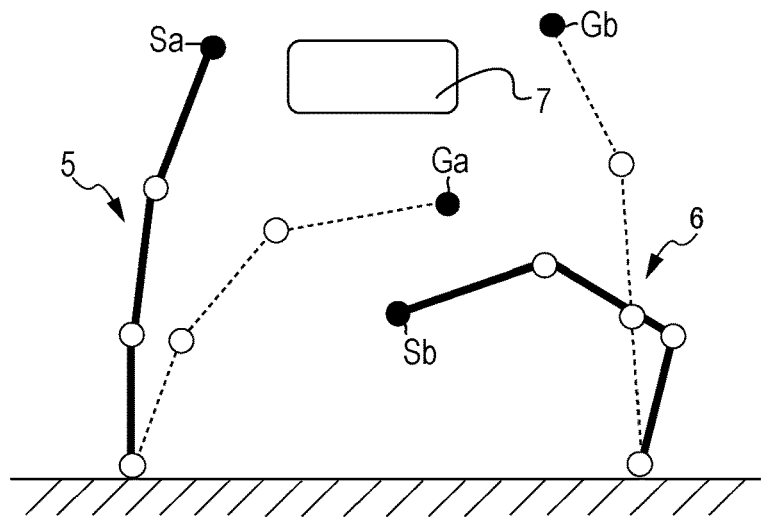
FIGS. 6A to 6C are diagrams illustrating trajectories and passing regions of the two robot arms according to the first embodiment.
Figure 6B:
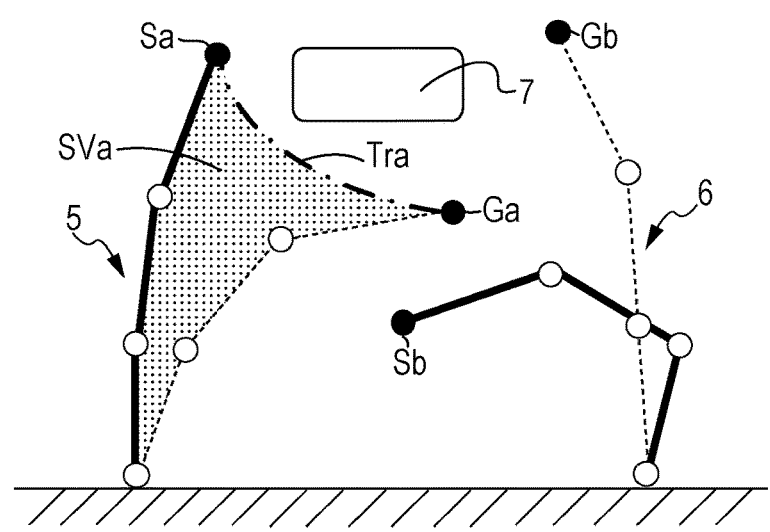
Figure 6C:
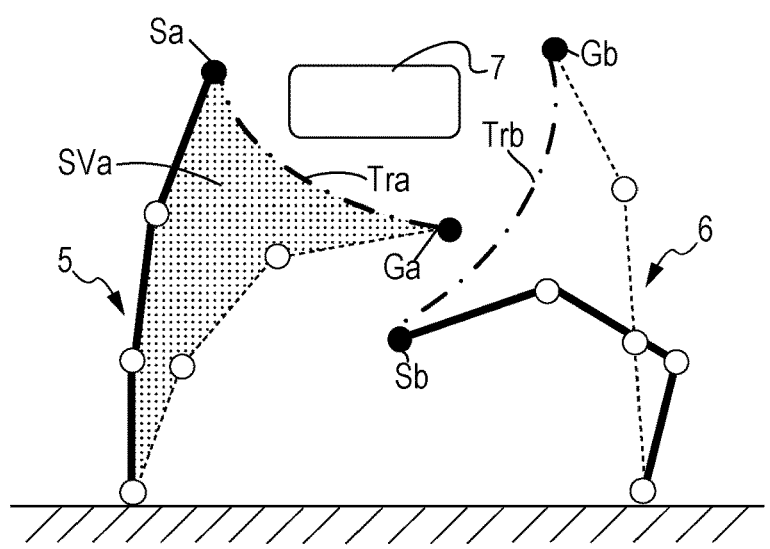

FIG. 3 is a flowchart illustrating entire robot trajectory generation control and FIG. 5 is a flowchart illustrating a procedure of control for generating robot trajectories such that passing regions of a plurality of robots of this embodiment do not overlap with each other. FIGS. 6A to 6C are diagrams illustrating trajectory generation based on a state of FIG. 4. Furthermore, FIG. 14 is a diagram illustrating a dialog displayed in the display 13 for an operation instruction input, and FIGS. 15A to 15C are diagrams illustrating transition of data content included in an obstacle memory according to the first embodiment.

In step S100 of FIG. 3, the operator inputs an instruction for operating the robot arms 5 and 6 through a user interface displayed on the display 13 using the keyboard 11, the mouse 12, or the like. For example, a dialog 131 illustrated in FIG. 14 is displayed in the display 13, and the operator inputs an operation instruction through the dialog 131.

In an upper portion in the dialog 131 of FIG. 14, a title bar 1311 including title display ("input of operation instruction" in this embodiment), for example, is displayed. The dialog 131 is divided into a section 1315 used to perform input for the robot arm 5 (A) and a section 1316 used to perform input for the robot arm 6 (B).

Each of the sections 1315 and 1316 has an upper section serving as an input section including individual rows of individual records corresponding to individual operation instructions. The upper section is divided into input fields 1321 to 1324, for example. The input field 1321 includes names of the operation instructions. The operator may input names of arbitrary operation instructions in this field or the names of the operation instructions may be successively generated by the CPU 20 in an automatic manner. In this embodiment, operation instructions Ma1 to Ma3 are input on the robot arm 5 (A) side and operation instructions Mb1 and Mb2 are input on the robot arm 6 (B) side.

In this embodiment, these operation instructions are input as starting points and ending points, serving as trajectory definition data, of trajectories corresponding to the individual operation instructions. The starting points and the ending points are represented by 3D (XYZ) coordinates for moving reference portions of the arms set in positions near base portions of the end effectors 54 and 64 in the tip ends of the robot arms 5 and 6, for example.

Data on the starting points and the ending points of the trajectories are input to the input field 1322 and the input field 1323, respectively. In FIG. 14, a pair of Sa1 and Ga1, a pair of Sa2 and Ga2, and a pair of Sa3 and Ga3 are input as pairs of a starting point and an ending point of the operation instructions Ma1, Ma2, and Ma3 of the robot arm 5 (A), respectively. Furthermore, a pair of Sb1 and Ga1 and a pair of Sb2 and Gb2 are input as pairs of a starting point and an ending point of the operation instructions Mb1 and Mb2 of the robot arm 6(B), respectively.

Note that, although the data on the starting points and the ending points are represented by character strings, such as "Sa1" and "Ga1" described above, in the fields in this embodiment, the data may be represented by numerical values, such as data on 3D coordinates in practice. In this case, the numerical values of the data on the starting points and the ending points may be manually input using the keyboard 11 or the like or may be determined by operating the robot arms 5 and 6 virtually displayed. For example, the operator points a space virtually displayed in the display 13 using the mouse 12 so as to input a coordinate of a reference portion of a desired arm. Alternatively, the operator may operate the robot arms 5 and 6 virtually displayed in the display 13 using the mouse 12 or the like so that the robot arms 5 and 6 are brought into positions and orientations corresponding to the desired coordinates of the arm reference portions, and the coordinates of the reference portions may be determined using a dialog not illustrated. In each case, numerical value data corresponding to the determined coordinates of the reference portions is input to the field 1322 and the field 1323 as starting point data and ending point data, respectively.

Furthermore, the field 1324 for specifying an operation instruction corresponding to a preceding operation is included in the sections 1315 and 1316 corresponding to the robot arms 5 and 6, respectively. The field 1324 is used to specify a preceding operation instruction (which is referred to by a name of the input field 1321, for example) of the operation instruction. The field 1324 realizes a linked list structure in each of the sections 1315 and 1316 corresponding to the robot arms 5 and 6, respectively, in which successive operation instructions are associated with each other. By arranging an input unit capable of associating successive operation instructions with each other, such as the field 1324 as illustrated in FIG. 14, the operator may perform an operation of exchanging input successive operation instructions with each other.

In a case where the operation instructions are input as illustrated in FIG. 14, the CPU 20 stores operation instruction data corresponding to the input operation instructions in a main memory or a virtual memory managed by the CPU 20 as an operation instruction list. Accordingly, FIG. 14 may be seen to illustrate screen display of a user interface or may be seen to illustrate a memory map corresponding to a configuration of the operation instruction list in the main memory or the virtual memory of the calculation processing unit 1. In this case, the operation instruction data is stored in the operation instruction list in the main memory or the virtual memory in a storage format of a linked list, for example, and successive operation instructions are associated with each other by pointer data the same as the field 1324.

Buttons 1317 which are to be operated by the mouse 12 or the like are disposed beneath the sections 1315 and 1316 so as to determine input trajectory definitions of the arms (A and B).

In step S100 of FIG. 3, the operator inputs desired operation instructions to the robot arms 5 and 6 using the interface described above, for example. In response to the input, the CPU 20 generates a data structure of an operation instruction list corresponding to the input of the operation instructions in the main memory or the virtual memory.

In step S101 of FIG. 3, a priority order setting of determining order of generation of operation trajectories is performed. Priority levels may be assigned to the individual robot arms 5 and 6 so as to represent whether the robot arm 5 or the robot arm 6 (A or B) is preferentially processed, for example. Furthermore, the priority levels may represent order of trajectory definition data corresponding to the operation instructions Ma1, Ma2, Ma3, and so on and the operation instructions Mab, Mb2, and so on input as illustrated in FIG. 14. In this way, if a variety of priority level settings (having different units) are provided, it is highly likely that preferred control results may be obtained in accordance with characteristics of operations performed by the robot arms 5 and 6 (A and B). An example of the control associated with the priority level for each robot arm or each operation instruction will be described hereinafter with reference to FIG. 18.

In step S102 of FIG. 3, one trajectory of the robot arm 5 (A) or the robot arm 6 (B) is generated in accordance with the data on the starting point and the ending point of trajectory definition data included in the operation instruction list in order of the priority levels determined in step S101. In this case, the CPU 20 calculates a trajectory from the starting point to the ending point such that (a space of) the obstacle registered in the obstacle memory is avoided as described below. A general trajectory generation algorithm, such as the RRT or the PRM described above, may be used for the calculation of the trajectory from the starting point to the ending point.

In step S103, when the robot arm 5 (A) or the robot arm 6 (B) is operated along the trajectory generated in step S102, a space in which a structure of the robot arm sweeps (passes) is registered in the obstacle memory as an obstacle in which the other robot arm may not intrude. The operations in step S102 and step S103 of FIG. 3 are successively performed in a loop illustrated in FIG. 5 described below in practice. By this, the trajectory generation is performed based on all the trajectory definition data (data on starting points and ending points) in the operation instruction list.

In the examples of FIGS. 4, 6A, 6B, and 6C, only operations of the robot arms 5 (A) and 6 (B) in planes of FIGS. 4, 6A, 6B, and 6C are illustrated. However, in a case where a robot arm is actually operated in a 3D working area, a space in which a structure of the robot arm sweeps and passes while changing its orientation has a specific shape and volume. Such a space in which a structure of a robot arm sweeps (passes) is referred to as "sweep (swept) volume" where appropriate. Therefore, in the examples of FIGS. 6A to 6C, a space in which a structure of a robot arm sweeps (passes) in a case where the robot arm is operated along a certain trajectory is denoted by a reference symbol such as "SVa".

FIGS. 6A to 6C are diagrams illustrating a state in which trajectories corresponding to the operation instructions Ma and Mb of the robot arms 5 and 6 (A and B) are generated. Here, the starting point and the ending point of the trajectory corresponding to the operation instruction Ma are represented by "Sa" and "Ga", respectively, and the starting point and the ending point of the trajectory corresponding to the operation instruction Mb are represented by "Sb" and "Gb", respectively. The starting points and the ending points are arranged as illustrated in FIG. 6A. Furthermore, trajectories generated by the trajectory calculation performed by the CPU 20 based on the operation instructions Ma and Mb are denoted by "Tra" and "Trb".

It is assumed that, in the example of FIGS. 6A to 6C, the trajectory of the robot arm 5 (A) is generated first due to the set priority level. Here, the trajectory Tra of the robot arm 5 (A) is generated in a shape illustrated in FIGS. 6B and 6C such that the trajectory Tra avoids the obstacle 7 which has been recorded in the obstacle memory. A sweeping region in which the structure of the robot arm 5 (A) sweeps by a robot operation along the generated trajectory is denoted by SVa.

The space SVa has a shape and a volume corresponding to a shape and an orientation of the structure of the robot arm 5 (A) and the trajectory Tra.

In this embodiment, after a trajectory of a robot arm is generated, a sweeping space SV of the robot arm is registered in the obstacle memory (which is the same as that storing the obstacle 7). FIGS. 15A to 15C are diagrams illustrating a state in which obstacles (SVx) are registered in an obstacle memory 2201 in accordance with the trajectory generation illustrated in FIGS. 6A to 6C.

The obstacle memory 2201 of FIGS. 15A to 15C mainly has two fields 2203 and 2204 which are secured in the main memory managed by the CPU 20, such as the RAM 22. Note that a reference numeral "22" for the RAM 22 is used for the entire storage region as a storage destination of the obstacle memory 2201 in FIGS. 15A to 15C. However, this is only for a convenience sake, and the obstacle memory 2201 may be secured in the main memory or the virtual memory (the RAM 22 and the HDD 23, for example) managed by the CPU 20 similarly to the case of the operation instruction list described above. This is true of FIGS. 16A to 16F and FIGS. 17A to 17F.

In the field 2203 of the obstacle memory 2201, identification data of an obstacle (a name, an identification number, or the like) is stored. Furthermore, in the field 2204, data on a shape which defines a 3D space of an obstacle (entity data of the shape data or data on a pointer to a separately secured storage space, not illustrated) is stored.

A format of the shape data in the field 2204 is arbitrarily determined. It is assumed that a working space is aggregate of unit voxels. In this case, the shape data of the obstacle stored in the obstacle memory 2201 may be a list of pointers to coordinate data of the voxels occupied by the obstacle as a simple example. Furthermore, as a data format which is easily referred to, a 3D voxel data table (not illustrated) in a voxel space corresponding to the working space may be secured in the main memory or the virtual memory. Then obstacle flags (and identification data of a robot which has generated the obstacle by structure sweeping) are arranged in memory cells corresponding to the voxels occupied by the obstacle in the voxel data table. By additionally using the voxel data table, the obstacle memory which facilitates a determination as to whether a specific coordinate in the working space is included in an obstacle region may be realized.

In the case of FIGS. 6A to 6C and FIGS. 15A to 15C, the trajectory Tra of the robot arm 5 (A) is generated as illustrated in FIG. 6B such that the trajectory Tra avoids the obstacle 7. Before this process, shape data of the obstacle 7 has been registered in the fields 2203 and 2204 as illustrated in FIG. 15A.

After the trajectory Tra of the robot arm 5 (A) is generated as illustrated in FIG. 6B, data on the sweeping space (SVa) is additionally registered in the obstacle memory 2201 as illustrated in FIG. 15B. In this case, a robot which has generated the obstacle may be identified using corresponding structure sweeping with reference to identification data in the field 2203 (a name such as "SVa" in the example of FIGS. 15B and 15C).

Subsequently, a trajectory (Trb of FIG. 6C) of the robot arm 6 (B) is generated in accordance with the starting point and the ending point (Sb and Gb). At this time, when the content of the obstacle memory 2201 is referred to, the object corresponding to the sweeping space (SVa) of the robot arm 5 (A) has been registered in the obstacle memory 2201 (FIG. 15B). Therefore, as illustrated in FIG. 6C, the CPU 20 generates the trajectory Trb of the robot arm 6 (B) in accordance with the starting point data and the ending point data (Sb and Gb) such that the trajectory Trb avoids the sweeping space (SVa) of the robot arm 5 (A).

After the trajectory Trb of the robot arm 6 (B) is generated, a space (SVb) in which the structure of the robot arm 6 (B) sweeps is additionally registered in the obstacle memory 2201 in a manner described above. FIG. 15C is a diagram illustrating a state of the obstacle memory 2201 immediately after the sweeping space (SVb) of the robot arm 6 (B) corresponding to the trajectory Trb is additionally registered.

As described above, by performing the trajectory generation and the obstacle memory management schematically illustrated in FIGS. 3, 4, 5, 6A, 6B, 6C, 14, 15A, 15B, and 15C, the trajectories of the robot arms 5 and 6 which do not interfere with each other and which do not interfere with the obstacle 7 included in the working environment may be generated.

In this embodiment, a time axis or a control timing is not used to avoid an obstacle. In this embodiment, a space in which a structure of a robot arm sweeps along a specific trajectory is registered in the obstacle memory 2201 as an obstacle space which is likely to be occupied by the robot arm. Therefore, even in a case where a timing shift, such as a delay of a robot operation in a real environment, occurs, trajectories in which robot arms do not interfere with each other or the robot arms and an obstacle do not interfere with each other may be reliably generated. Specifically, according to this embodiment, more fail-safe robot trajectories may be generated.

The robot trajectory generation and the process of additionally registering an obstacle in step S102 and step S103 of FIG. 3, respectively, will be described further in detail with reference to FIG. 5.

FIG. 5 is a flowchart illustrating a control procedure of generating trajectories such that passing regions of robots do not overlap with each other in this embodiment. As illustrated in FIG. 3, the entire control flow is started from the input of operation instructions and the generation of an operation instruction list (S100) and the priority level setting (S101). Thereafter, the trajectory generation (S102) and the addition of an obstacle (S103) are performed. FIG. 5 is a flowchart illustrating the control procedure in detail.

FIG. 5 includes the following control processes. Specifically, an operation instruction list including starting points and ending points of trajectories of a plurality of robot arms is generated (a trajectory definition data generation process: S200). Order of generation of trajectories is determined in accordance with the operation instruction list (a generation order determination process: S210). A trajectory of a specific robot arm included in the operation instruction list is generated in accordance with a starting point and an ending point such that the trajectory avoids obstacle spaces registered in the obstacle memory when a trajectory of the other robot arm is generated (a trajectory generation process: S230). A sweeping space in which a structure of the arm sweeps when the robot arm is operated along the generated trajectory is added to the obstacle memory as an obstacle space to be avoided by the other robot arm (an obstacle registration process: S240 and S250).

In FIG. 5, the input of operation instructions and the generation of an operation instruction list (S100) in FIG. 3 correspond to step S200 and the priority level setting (S101) corresponds to step S210. Step S220 corresponds to an initializing process of a loop from step S230 to step S260. Furthermore, the trajectory generation (S102) of FIG. 3 corresponds to step S230 and the obstacle addition (S103)

corresponds to step S250. In step S260, a control step of executing the processes in step S230 to step S250 in accordance with the trajectory definition data (the starting points and the ending points) included in the operation instruction list is performed.

In step S200 of FIG. 5, the operator (the teaching person) inputs instructions for operations of generating trajectories to all the robot arms through the user interface illustrated in FIG. 14. It is assumed here that the operation instruction Ma1 is assigned to the robot arm 5 in accordance with the trajectory definition data of the starting point and the ending point (Sa and Ga). Furthermore, it is assumed that the operation instruction Mb1 is assigned to the robot arm 6 as trajectory definition data operation instruction Op1 of the starting point and the ending point (Sb and Gb).

The operation instruction indicates aggregate of a plurality of operations assigned to each of the robot arms. Data on the operation instructions is stored in the main memory or the virtual memory managed by the CPU 20 as the operation instruction list described above.

Furthermore, an operation (M) is defined by trajectory definition data including a pair of coordinates of a starting point and an ending point of a reference portion corresponding to a base portion of the end effectors (54 and 64) of the robot arms (5 and 6).

In a case where the robot arms (5 and 6) of the articulated robot have a plurality of orientations in positions of the end effectors (54 and 64), a combination of angles of joints is specified as a starting point or an ending point.

The operation instruction Op1 obtained as described above is represented as follows: Op1={Ma1, Mb1}, and the operations (Ma1 and Mb1) are represented as follows: Ma1=(Sa, Ga) and Mb1=(Sb, Gb).

Subsequently, in step S210 of FIG. 5, trajectory generation order is determined, that is, order of generation of operation trajectories in the operation instruction list is determined. Various methods may be considered as a method for determining the order since an operation time of the entire robot is affected by the method.

Although an example of priority level control will be described in detail hereinafter, it is assumed here that the operator sets a priority level of the operation of the robot arm 5 (A) higher than that of the robot arm 6 (B). A case where importance levels of operations executed by robot arms are considerably different from each other may occur sometimes. Therefore, since the user (the operator) may set a priority level for each robot arm as described above, more realistic trajectory generation may be performed.

If the priority level of the operation of the robot arm 5 (A) is higher than that of the robot arm 6 (B), a trajectory of the robot arm 5 is generated first in accordance with the operation instruction Ma1 before a trajectory of the robot arm 6 is generated in accordance with the operation instruction Mb1. Furthermore, since control in terms of the time axis is not performed in the trajectory generation and the obstacle registration in this embodiment, the operations (M) in the operation instruction list may be shuffled irrespective of the order of inputting, for example, and the trajectory generation (and the obstacle registration) may be performed in the specific priority order. The process in step S210 is realized by a process of securing a table memory or the like which stores the generation order and storing pointer data or the like indicating the operations (M) in the operation data instruction list in the priority order as described above.

In the loop control of FIG. 5, the order of trajectory generation (obstacle registration) is controlled by a pointer (or a counter) i. Here, "i=0" corresponds to a priority order of a process of a first priority and i is successively incremented from 0 one by one, but thereafter, a priority level is successively lowered. Therefore, in step S220 of FIG. 5, the pointer (or the counter) i of the order is initialized to 0.

Thereafter, the trajectory generation corresponding to the operation instruction Mi (S230: the robot trajectory generation process), the generation of a passing (sweeping) region of a robot arm corresponding to the operation instruction Mi (S240), and the passing (sweeping) region additional registration (S250: obstacle registration process) are repeatedly performed. The control loop is continuously performed until it is determined that all operation instructions have been processed in step S260. If at least one of the operation instructions has not been processed, the control returns from step S260 to step S230 while the pointer (or the counter) i is incremented (i=i+1).

In step S230, trajectory generation for one operation of a robot is performed. The process of step S230 may be executed by three processes, that is, a path planning process, a path shortening process, and a trajectory calculation process, for example.

Among these processes, in the path planning process, a path from a starting point to an ending point which avoids an obstacle is obtained. To obtain the path, a method for automatically calculating the path by random searching performed by the CPU 20 may be used among various general methods including the RRT and the PRM described above.

Subsequently, in the path shortening process, the path generated in the path planning process may be modified. In a case where the method using the random searching is selected in the path planning process, the generated path may be a detour or an angle may be sharply changed, and therefore, the path is to be modified. Any method may be employed in the path shortening process in this embodiment, such as a method for searching points in the path connected to each other without interference or a method for smoothing the path by approximation using a spline curve.

In the path planning process and the path shortening process, a process of checking whether the robot arms (5 and 6) do not interfere with each other or do not interfere with the obstacle (7) is performed in the 3D virtual space. Here, the shape data of the robot arms (5 and 6) and the obstacle data (SV) stored in the obstacle memory 2201 may be used as aggregate of voxels (or polygons) described above, for example. Then it is determined whether aggregates of voxels (polygons) are geometrically in contact with each other so that it is determined whether the robot arms (5 and 6) interfere with each other or interfere with the obstacle (7).

Note that although the passing (sweeping) region of the arm based on the trajectory generation is stored in the obstacle memory 2201 as the obstacle data (SV), generally (naturally), the obstacle data (SV) generated due to passing (sweeping) of own arm may not be avoided. For example, in the generation of a trajectory (a path) of the operation (Ma) of the robot arm 5 (A) in the configuration described above, an obstacle (SVb) generated by passing (sweeping) of the operation (Mb) of the robot arm 6 (B) is avoided. However, in the generation of a trajectory (a path) of the operation (Ma) of the robot arm 5 (A), an obstacle (SVa) generated by passing (sweeping) of the operation (Ma) of the robot arm 5 (A) is not avoided.

In the trajectory calculation process in step S240, rotation speeds and acceleration degrees of joints of the robot arms (5 and 6) are calculated so that the robot arms (5 and 6) move on the paths (the trajectories) generated by the path planning process and the path shortening process described above in a shortest time. Note that, in the trajectory calculation step, the rotation speeds and the acceleration degrees of the joints are calculated so as not to exceed restriction conditions stored in a storage unit 3. However, in the trajectory calculation of this embodiment, synchronization between the robot arms is not taken into consideration since a most fail-safe obstacle avoiding condition is used, and trajectories are obtained such that the individual robots operate in shortest times.

Trajectory data groups generated in the trajectory calculation process (control data of the robot arms) are stored in the main memory or the virtual memory or stored in a storage region for trajectory data, not illustrated, secured in the HDD 23 or the like.

In step S240, a region (a space) in which the structure (the links and the joint shafts) of the robot arm passes (sweeps) when the robot arm is operated along the trajectory obtained in step S230 is calculated. Geometry data including shapes and sizes of the robot arms (5 and 6) is stored in advance in the HDD 23, the ROM 21, or the like so that the CPU 20 may calculate the passing (sweeping) region (space) described above based on the geometry. In an actual calculation, various general methods including a swept volume generation method for obtaining a region in which a moving object has passed or a method for approximating a passing region to a simple shape, such as a cube or a spherical body may be used. Furthermore, the shape data may be represented as aggregate of polygons to be used in the interference checking process. Note that the geometry data including the shapes and the sizes of the robot arms (5 and 6) may be used to control virtual display on the display 13.

In the example of FIG. 6B, in a case where the trajectory Tra of the robot arm 5 is generated, when a structure moves from the starting point Sa to the ending point Ga in accordance with the calculation of the passing (sweeping) region performed by the CPU 20 described above, the passing (sweeping) region (SVa) in FIG. 6B is generated.

In step S250, the passing (sweeping) region (SV) generated based on the trajectory generation in step S230 is registered in the obstacle memory 2201. The region, that is, the obstacle, registered in the obstacle memory 2201 is added as a new obstacle in the virtual space and in the trajectory generation for the robot arm (6), a trajectory calculation is performed such that all obstacle data in the obstacle memory 2201 is avoided.

In the example of FIGS. 6A to 6C, after the trajectory generation corresponding to the operation instruction Ma1 for the robot arm 5 and the addition of the obstacle of the passing region are terminated, the trajectory generation corresponding to the operation instruction Mb1 for the robot arm 6 (and addition of an obstacle of a passing region) is performed. Although a processing flow is the same as that described above, the passing region SVa is newly added as a new obstacle before the trajectory generation corresponding to the operation instruction Mb1 for the robot arm 6 is performed (FIG. 15B). Therefore, when the trajectory generation corresponding to the operation instruction Mb1 is performed, not only the obstacle 7 disposed in advance but also the passing region SVa of the trajectory Tra corresponding to the operation instruction Ma1 is avoided as illustrated in FIG. 6C.

In this way, the trajectory Trb of the robot arm 6 which does not overlap with the trajectory Tra of the robot arm 5 may be obtained. Although the case where the trajectory generation is performed for the robot arms 5 and 6 in this order is described as the simplest example in the description above, the passing (sweeping) region corresponding to the trajectory Trb of the robot arm 6 is also added to the obstacle memory 2201 as a new obstacle. By this, the trajectory generation may be continuously performed in accordance with succeeding operation instructions (without interference).

Although the case of the two robot arms is described as the simplest example in the foregoing description, the trajectory generation and the obstacle registration for three or more robot arms may be performed in the same procedure described above.

As described above, according to this embodiment, a trajectory in which the robot arms (5 and 6) do not interfere with not only the obstacle (7) in the working environment but also each other may be generated. Therefore, a plurality of robot arms may be operated along trajectories which do not interfere with each other. The avoiding control based on the generation of an obstacle and the registration to the obstacle memory of this embodiment does not depend on a time axis or a control timing. Specifically, a sweeping (passing) space (region) of a robot arm is registered in the obstacle memory as a largest range of a possible position and orientation of the arm in the time axis. Therefore, according to this embodiment, trajectories which may avoid interference between the robot arms (5 and 6) may be reliably generated even if a timing shift, such as a delay of arm control, occurs in the real environment. Furthermore, the basic control of trajectory generation (and the obstacle registration) illustrated in this embodiment do not utilize the exclusive space control in a time axis direction which is used in the general methods, and therefore, the trajectory generation control may be easily executed at comparatively high speed without using excessive calculation resources.

Note that the configuration in which one obstacle memory is included in the main memory or the virtual memory is illustrated in this embodiment (and embodiments below) for simplicity of the description. In this case, the obstacle data includes identification data of the robot arms (5, 6, and so on), and in generation of a trajectory of a certain arm, obstacles corresponding to sweeping regions of arms other than the obstacle corresponding to a sweeping region of the own arm are avoided. However, various forms are considered as implementation of one obstacle memory in the main memory or the virtual memory, and therefore, those skilled in the art may perform various design changes on the implementation of the obstacle memory and part of control using the obstacle memory.

For example, obstacle memories may be disposed for respective robot arms (5, 6, and so on) so that an obstacle corresponding to a sweeping region of an arm may be added to the obstacle memories other than the obstacle memory of the arm of interest in the trajectory generation. Also by this obstacle memory implementation, the trajectory generation process of generating a trajectory for operating the robot arm such that obstacle spaces other than a registered obstacle space of the robot arm of interest are avoided may be realized.

Second Embodiment

In the first embodiment, a method for generating trajectories of the robot arms (5 and 6) which do not interfere with each other is illustrated as the simplest example for generating trajectories in response to two operation instructions corresponding to the robot arms 5 and 6. In a case where the trajectory generation and the obstacle registration are repeatedly performed on a larger number of trajectory definition data only with the step configuration described with reference to FIG. 5 of the first embodiment, a case where a trajectory may not be newly generated may occur due to a large number of registered obstacles.

In the basic control of this embodiment, since an entire region in which an arm structure sweeps (passes) in the trajectory generation is registered as an obstacle, as the number of operation instructions for trajectory generation becomes large, a large portion of a working space may be occupied by obstacles in an earlier stage.

In general, a large number of operations are assigned to a robot operating in a real environment, such as a robot operating in a production line. For example, even a simple conveying operation includes two operations, that is, an operation of fetching an object to be conveyed and an operation of placing the object. Specifically, an instruction input by an operator may include a plurality of operations for a robot. In the basic control illustrated in the first embodiment, a passing region of all operations performed by one of a plurality of robots does not overlap with a passing region of all operations performed by the other of the plurality of robots so that trajectories of the plurality of robots are generated such that the passing regions of the plurality of robots do not overlap with each other. However, the larger the numbers of operations assigned to the robots are or the smaller the working space is, the more difficult generation of such trajectories is.

Figure 8A:
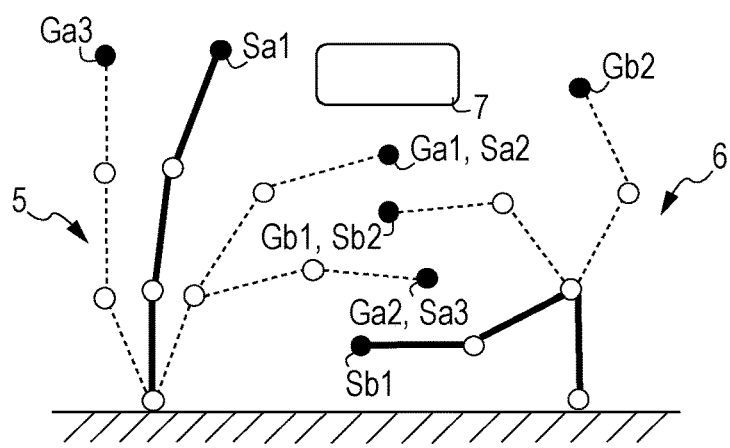
FIGS. 8A to 8D are diagrams illustrating trajectories and passing regions of two robot arms according to the second embodiment.
Figure 8B:
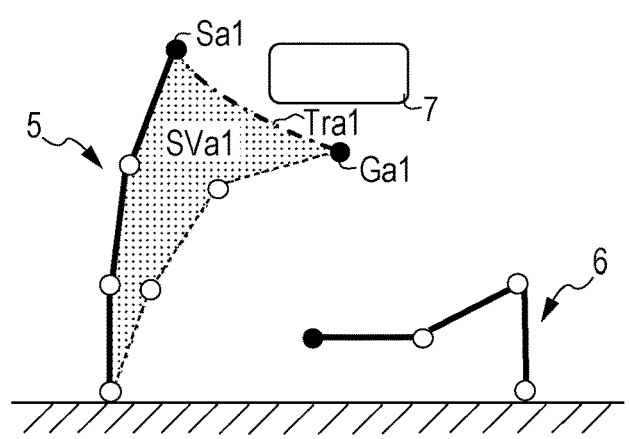
Figure 8C:
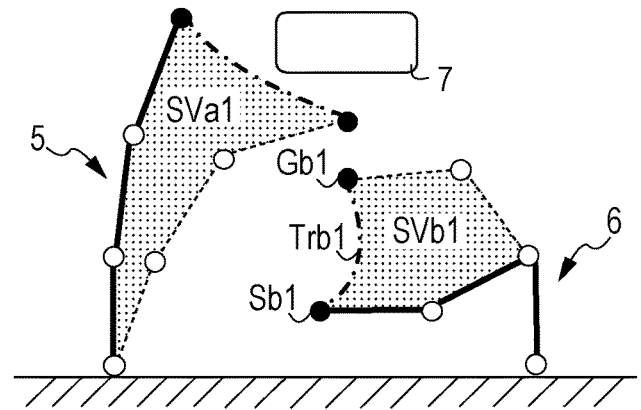
Figure 8D:
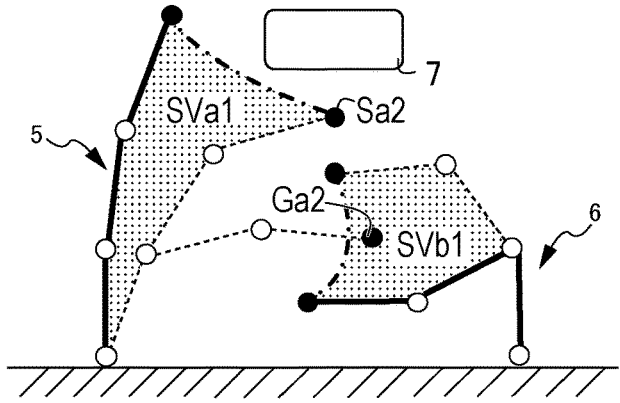

For example, FIG. 8C is a diagram illustrating a state in which a trajectory Trb1 (a starting point Sa1 to an ending point Ga1) of a robot arm 6 is generated and an obstacle corresponding to a sweeping (passing) region (SVb1) is registered in an obstacle memory 2201. Thereafter, it is assumed that an operation instruction corresponding to a starting point Sa2 and an ending point Ga2 to be generated for a robot arm 5 is included in an operation instruction list. Trajectory definition of this operation instruction, in particular, the ending point Ga2, is included in a space of the obstacle SVb1 as illustrated in FIG. 8D. In this state, a robot trajectory corresponding to trajectory definition having the starting point Sa2 and the ending point Ga2 in the operation instruction may not be generated.

Hereinafter, in a second embodiment, a control method for enabling continuous performance of trajectory generation and obstacle registration in a case where the phenomenon of FIG. 8D occurs when the trajectory generation is performed in accordance with a larger number of operation instructions is illustrated. Furthermore, in this case, the control method enables operations of robot arms in a real environment along generated trajectories without interference with each other.

In the second embodiment, in a case where trajectories of robots which do not intersect with each other may not be generated in response to a given instruction, the instruction is divided into two and trajectories of the robots which do not intersect with each other in accordance with the divided instructions are generated.

Specifically, when the trajectory generation is performed based on the plurality of trajectory definition data included in the operation instruction list, a case where a trajectory which avoids obstacle spaces registered in the obstacle memory is not generated may occur. In this case, the trajectory definition data included in the operation instruction list is divided into a first operation instruction constituted by trajectory definition data corresponding to trajectories which have been generated by this time point and a second operation instruction constituted by trajectory definition data corresponding to trajectories which have not been generated. After data on the obstacle spaces registered in the obstacle memory is cleared, the trajectory generation process and the obstacle registration process are repeatedly executed on the trajectory definition data included in the second operation instruction. Furthermore, in a case where the robot arms are operated in accordance with all the generated trajectory data, a synchronization instruction for synchronously executing an operation of the robot arm corresponding to the first operation instruction and an operation of the robot arm corresponding to the second operation instruction is generated.

Hereinafter, the control of this embodiment will be described with reference to FIG. 7, FIGS. 8A to 8D, FIGS. 9A to 9D, FIG. 10, and FIGS. 16A to 16F. The entire configuration of the trajectory generation system of the first embodiment described above illustrated in FIGS. 1, 2, and 4 is also employed in this embodiment hereinafter. Arrangement of the robot arms 5 and 6 and the obstacle 7 is the same as that of FIG. 4.

Figure 7:
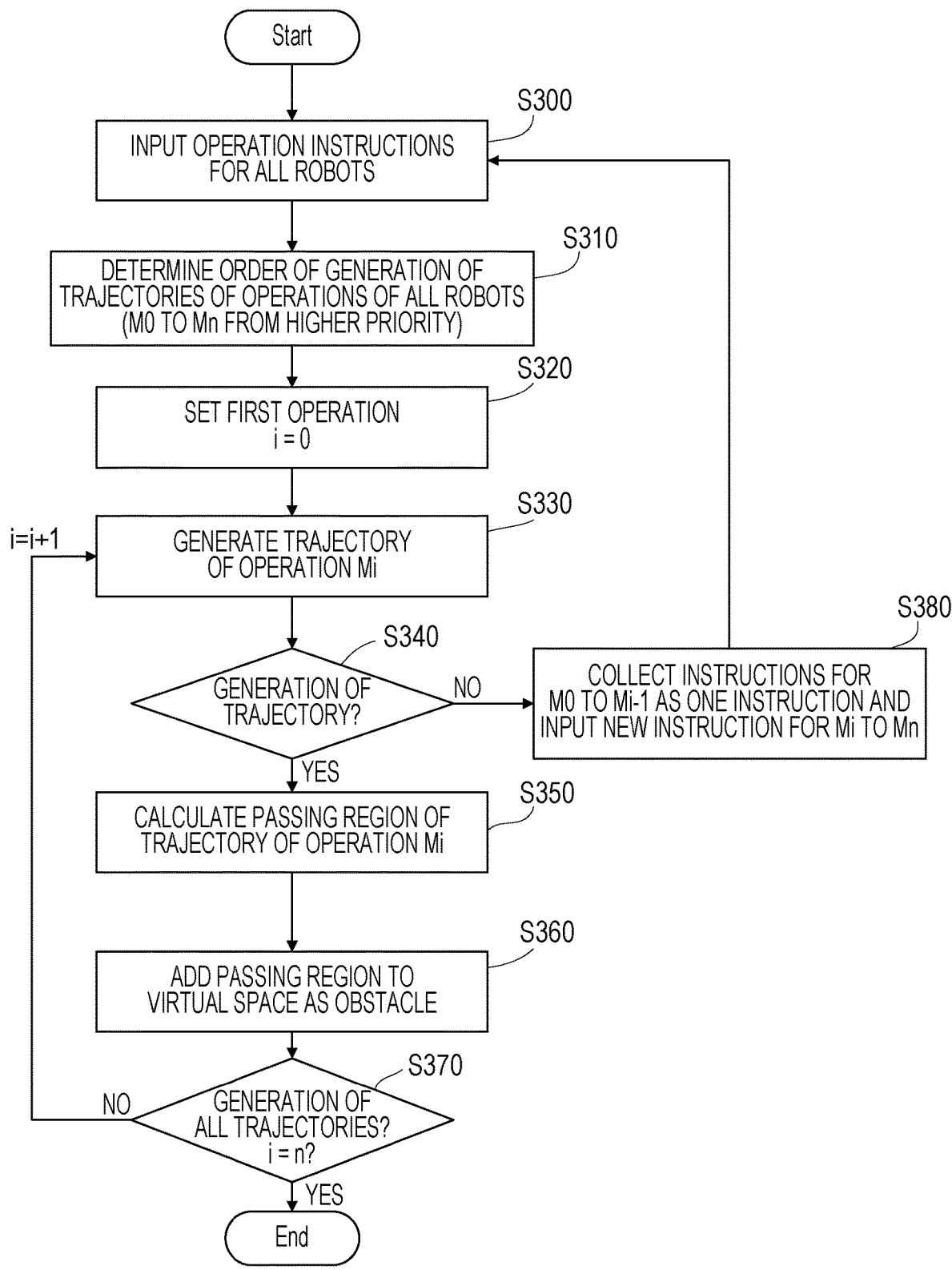
FIG. 7 is a flowchart illustrating trajectory generation control according to the second embodiment.

FIG. 7 is a flowchart illustrating a procedure of the trajectory generation and the obstacle registration of this embodiment in detail in a format similar to FIG. 5 in the first embodiment. FIGS. 8A to 8D and FIGS. 9A to 9D are diagrams illustrating states of the trajectory generation in detail in formats similar to those of FIG. 4 and FIGS. 6A to 6C. FIG. 10 is a diagram illustrating a state of synchronization control of operations performed in accordance with operation instructions corresponding to the trajectory generation in this embodiment. FIGS. 16A to 16F are diagrams illustrating transition of data content of the obstacle memory 2201 of this embodiment in a format similar to that of FIGS. 15A to 15C. Hereinafter, redundant descriptions of members and processing steps described in the first embodiment are omitted unless otherwise required.

In this embodiment, the entire flow of the procedure of the trajectory generation and the obstacle registration is the same as that of the first embodiment illustrated in FIG. 3, and the entire flow of the control procedure is started from an input of operation instructions and generation of an operation instruction list (S100) and a priority level setting (S101). Thereafter, the trajectory generation (S102) and the obstacle addition (S103) are performed.

A process in step S300 (input of operation instructions and generation of an operation instruction list), a process in step S310 (a priority level setting), a process in step S320 (initialization of a pointer/counter), and a process in step S330 (generation of a trajectory of an operation instruction Mi) in FIG. 7 are the same as the processes in step S200, step S210, step S220, and step S230 of FIG. 5, respectively. A process in step S350 of FIG. 7 (generation of a passing (sweeping) region of a robot arm corresponding to the operation instruction Mi) and a process in step S360 (additional registration of a passing (sweeping) region) are the same as the processes in step S240 and step S250 of FIG. 5, respectively. Furthermore, a process in step S370 of FIG. 7 (a loop end determination) is the same as the process in step S260 of FIG. 5.

The process in FIG. 7 is considerably different from the process in FIG. 5 in that step S340 and step S380 are added between step S330 (generation of a trajectory of the operation instruction Mi) and step S350 (generation of a passing (sweeping) region of a robot arm corresponding to the operation instruction Mi).

In step S340, it is determined whether a trajectory corresponding to the operation instruction Mi has been generated in step S330. If the trajectory corresponding to the operation instruction Mi has not been generated due to sweeping spaces of obstacles which have been registered in the obstacle memory 2201, the process proceeds to step S380.

In step S380, the trajectory definition data in the operation instruction list is divided into a first operation instruction constituted by trajectory definition data corresponding to generated trajectories and a second operation instruction constituted by trajectory definition data corresponding to trajectories which have not been generated. After data on obstacle spaces registered in the obstacle memory is cleared, the process returns to step S300. In this case, in step S300 and step S310, control is performed hereafter such that priority order of the processes corresponding to the operation instructions constituted by the trajectory definition data corresponding to the trajectories which have not been generated in the operation instruction list (the operation instructions included in the second operation instruction) is determined.

Hereinafter, the process in FIG. 7 will be described taking operation instructions illustrated in FIGS. 8A to 8D, FIGS. 9A to 9D, and FIG. 10 as examples.

In step S300 of FIG. 7, as with the operation in step S100 (FIG. 3) and the operation in step S200 (FIG. 5), input of operation instructions and generation of an operation instruction list are performed. It is assumed here that the operation instruction list generated based on inputs by the operator includes three operation instructions Ma1 to Ma3 for the robot arm 5 and two operation instructions Mb1 and Mb2 for the robot arm 6.

FIG. 8A is a diagram illustrating trajectory definition (starting points and ending points) corresponding to the operation instructions. In FIG. 8A, the operation instructions Ma1 to Ma3 correspond to trajectory definitions having starting points Sa1 to Sa3 and ending points Ga1 to Ga3, respectively, and the operation instructions Mb1 and Mb2 correspond to trajectory definitions having starting points Sa1 and Sb2 and ending points Ga1 and Gb2, respectively.

Specifically, in the trajectory definitions, the operation instruction Ma1 moves a reference portion of the arm from the starting point Sa1 to the ending point Ga1 (Sa2) of FIG. 8A, the operation instruction Mat moves the reference portion of the arm from the starting point Sa2 to the ending point Ga2 (Sa3), and the operation instruction Ma3 moves the reference portion of the arm from the starting point Sa3 to the ending point Ga3. The robot arm 5 moves from a position of Sa1 to a position of Ga3 through positions of Ga1 and Ga2.

Furthermore, the operation instruction Mb1 of the robot arm 6 moves a reference portion of an arm from the starting point Sa1 to the ending point Ga1 and the operation instruction Mb2 moves the reference portion of the arm from the starting point Sb2 to the ending point Gb2 in FIG. 8A. In this case, the robot arm 6 moves from a position of Sa1 to a position of Gb2 through a position of Ga1. An operation instruction list corresponding to an instruction Op1 is configured as follows.

Op1={Ma1, Ma2, Ma3, Mb1, Mb2}
Ma1=(Sa1, Ga1), Mb1=(Sa1, Ga1), Ma2=(Sa2, Ga2), Mb2=(Sb2, Gb2), Ma3=(Sa3, Ga3)

In step S310 of FIG. 7, order of trajectory generation is determined in accordance with set priority order. Control of the priority order (for each robot or for each operation instruction) of the trajectory generation may be performed by various methods as described above, and the operator may specify the priority order, for example.

However, in this embodiment, the priority order of the trajectory generation is set (for individual robots or for individual operation instruction) by automatic control performed by a CPU 20. Here, the priority levels are set such that trajectory generation of a robot arm having a larger number of the trajectory definition data in the operation instruction list is performed before trajectory generation of a robot arm having a smaller number of trajectory definition data in the operation instruction list. In this case, in a configuration of the operation instruction list described above, the robot arm 5 has a larger number of operations, and therefore, the robot arm 5 has a higher priority level.

As for the priority order for each operation instruction, order of processes of the operation instructions may be changed to arbitrary order in accordance with an input specified by the operator, for example. However, in this embodiment, the priority order corresponds to the order in the operation instruction list (Ma1, Ma2, and so on or Mb1, Mb2, and so on) for simplicity of description.

However, in this embodiment, control of processing order of generating trajectories of all the arms in turn is employed so that an arm having a number of operation instructions which have not been subjected to the trajectory generation is not included in the plurality of robot arms. This is because a problem in which trajectories of only a first robot are generated in a concentrated manner and therefore trajectories of a second robot may not be generated due to passing regions of the first robot is to be avoided.

Note that an example of the control of the processing order of the trajectory generation (and the obstacle registration) of this embodiment described above will be described in a last part of this embodiment with reference to a flowchart of FIG. 18.

According to the control of the processing order of the trajectory generation (and the obstacle registration) of this embodiment described above, the trajectory generation is performed on the operation instructions in the following order: Ma1, Mb1, Mat, Mb2, and Ma3.

After the operation in step S320 of FIG. 7 (the initialization of the pointer/counter), the trajectory generation is performed in step S330 in the order determined in step S310. The trajectory generation in step S330 is the same as the process in step S230 of FIG. 5.

In step S340 of FIG. 7, it is determined whether the trajectory generation is successfully performed in step S330. When the determination is affirmative, the process proceeds to step S350, and otherwise, the process proceeds to step S380. Examples of a case where the trajectory is not generated include a case where a path to an ending point is blocked by a passing region of another robot arm and a case where a starting point or an ending point is included in the passing region of the other robot arm.

In an example of FIGS. 8A to 8D, first, the operation instruction Ma1 for the robot arm 5 is processed. In this case, a trajectory Tra1 which moves from the starting point Sa1 to the ending point Ga1 and which avoids the obstacle 7 may be generated, and therefore, the process proceeds to step S350.

In step S350 and step S360, obstacle data of a passing (sweeping) region (SVa1) generated by the trajectory is generated and is registered in the obstacle memory 2201. By this, the obstacle memory 2201 changes from a state in which only the obstacle 7 is registered in the obstacle memory 2201 illustrated in FIG. 16A to a registration state illustrated in FIG. 16B. Specifically, the passing (sweeping) region (SVa1) of the robot arm 5 generated by the trajectory Tra1 of the operation instruction Ma1 is newly added as an obstacle.

As illustrated in FIG. 8C, the trajectory generation and the obstacle addition may be performed on the next operation instruction Mb1 in the same procedure described above. A trajectory for the operation instruction Mb1 may be generated in step S330 and step S340, and a passing (sweeping) region (SVb1) corresponding to a trajectory Trb1 is newly added to the obstacle memory 2201 as illustrated in FIG. 16C.

The process further proceeds, and the trajectory generation is attempted for the operation instruction Ma2 associated with the robot arm 5 in step S330. The operation instruction Ma2 includes a definition of a trajectory from the starting point Sat to the ending point Ga2 as illustrated in FIG. 8A. However, as illustrated in FIG. 8D, a position of the ending point Ga2 of the operation instruction Ma2 is included in the obstacle (SVb1) added in the procedure described above and interfere with the obstacle, and therefore, the trajectory generation may not be performed. In this case, the process proceeds to step S380 in FIG. 7.

In step S380, the CPU 20 performs a process to be performed when a trajectory is not generated. In step S380, first, (a group of) the operation instructions is divided into a first operation instruction (a first half group) which has been subjected to the trajectory generation (and the obstacle registration) and second operation instruction (a second half group) which has not been subjected to the trajectory generation (and the obstacle registration).

Specifically, all the operation instructions corresponding to the trajectories generated by this time are assigned to the first operation instruction (the first half group) and all the succeeding operations which have not been subjected to the trajectory generation (and the obstacle registration) are assigned to the second operation instruction (the second half group). In the example of the second embodiment, the operation instructions Ma1 and Mb1 are assigned to the first operation instruction (a first half: Op1-1) and the operation instructions Ma2, Mb2, and Ma3 are assigned to the second operation instruction (a second half: Op1-2).

Note that the division into the first and second operation instructions may be performed once or the second operation instruction may be further divided into a first operation instruction (which has been processed) and a second operation instruction (which has not been processed) if the trajectory generation may not be performed in a process corresponding to the second operation instruction in the second half (a remaining portion). By repeatedly performing this process, all the operation instruction data is processed.

Furthermore, in the case where the division into the first and second operation instructions occurs, operations of the robot arms (5 and 6) corresponding to the first and second operation instructions are synchronously executed before and after the division. Specifically, synchronization control is performed such that after all the operations corresponding to the first operation instructions are terminated, operations corresponding to the second operation instructions are started. Since the synchronization control is performed, when the division of an operation instruction is performed, the CPU 20 generates a synchronization instruction (denoted by "Sp1" in FIG. 10) for synchronizing the operations of the robots as described above in a real environment. The synchronization instruction ("Sp1" of FIG. 10) is inserted into a position in which a group of generated trajectory data is divided, for example.

Then the CPU 20 clears obstacle data corresponding to sweeping (passing) regions of the robot arms generated when the trajectory generation is performed from the obstacle memory 2201 as illustrated in FIG. 16D. In this case, the obstacles SVa1 and SVb1 which are added when the trajectories corresponding to the operation instructions Ma1 and Mb1 are generated, respectively. By this, trajectory generation for an operation of a next instruction becomes available.

Thereafter, the process returns to step S300 and the process described above is repeatedly performed so that the trajectory generation (and the obstacle registration) for the second operation instructions corresponding to the unprocessed portion (the second half group) is executed. Note that, as measure for performing processing based on trajectory definitions corresponding to the second operation instructions (the second half: Op1-2), the CPU 20 may perform a process of deleting processed portions in the operation instruction list in step S380.

As described above, the first operation instruction (the first half: Op1-1) and the second operation instruction (the second half: Op1-2) obtained by dividing the operation instruction Op1 as described above are configured as follows.

Op1-1={Ma1, Mb1}
Op1-2={Ma2, Mb2, Ma3}

Note that the CPU 20 generates the synchronization instruction ("Sp1" of FIG. 10) for synchronously controlling the operations of the first and second operation instructions (the first half and the second half) in the real environment when the division of the operation instruction is performed as described above. The synchronization instruction ("Sp1" of FIG. 10) is inserted into a position in which a group of generated trajectory data is divided, for example.

Thereafter, in step S300, since the process in step S380 is performed before step S300, a trajectory definition corresponding to the second operation instruction (the second half: Op1-2) is set as a processing target. Specifically, the operation instruction Op1-2 including the operation instructions Ma2, Mb2, and Ma3 described above is input.

Figure 9A:
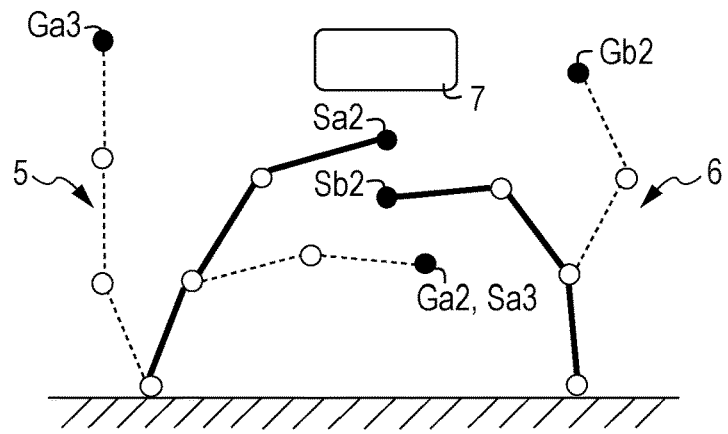
FIGS. 9A to 9D are diagrams illustrating trajectories and passing regions of two robot arms according to the second embodiment.
Figure 9B:
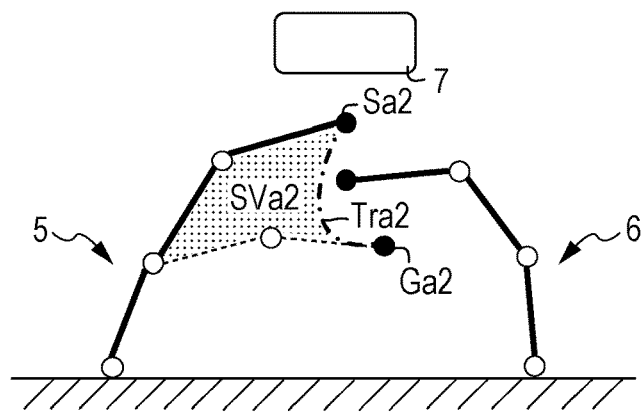
Figure 10:
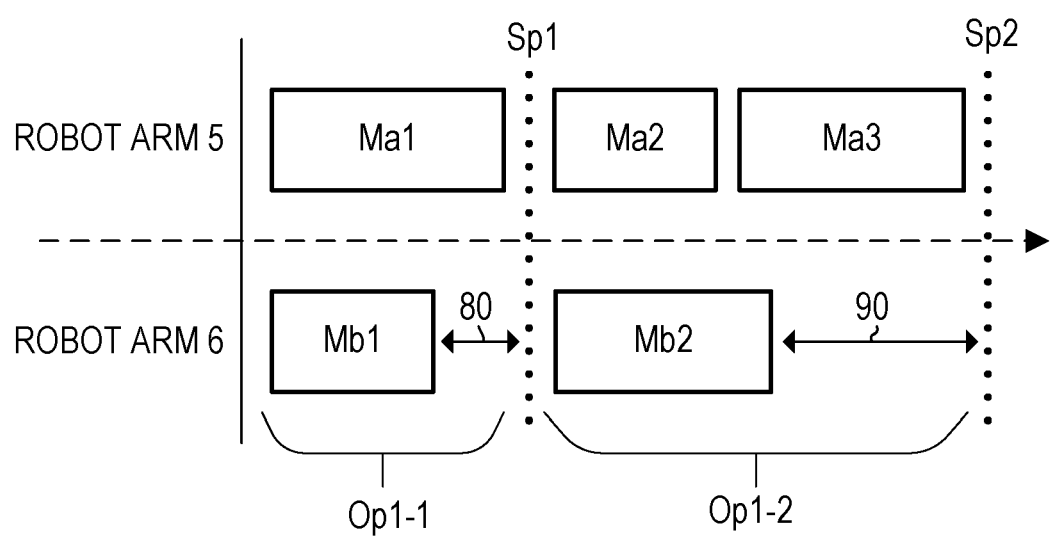
FIG. 10 is a diagram illustrating timings of operations of the two robot arms according to the second embodiment.

FIG. 9A is a diagram illustrating current positions of the robot arms at the beginning of the process corresponding to the second operation instruction (the second half: Op1-2) and positions of starting points (Sa2, Sb2, and Sa3) and ending points (Ga2, Gb2, and Ga3) of the operation instructions Ma3, Mb2, and Ma3.

Subsequently, in step S310 of FIG. 7, order of trajectories to be generated is determined as described above. As described above, priority levels of the robot arms are set in accordance with the numbers of operations and processing order is determined in accordance with the priority levels. Even in the process corresponding to the second operation instruction (the second half: Op1-2), the robot arm 5 has a larger number of operations, and therefore, the robot arm 5 has a higher priority level. Accordingly, the trajectory generation process is performed in accordance with the operation instructions Ma2, Mb2, and Ma3 in this order.

Hereinafter, the CPU 20 executes the trajectory generation process and the obstacle registration process in step S330 to step S360 of FIG. 7 on the second operation instruction (the second half: Op1-2) similarly to the process description above. The operation instruction Ma2 which is first issued corresponds to an operation moving from the starting point Sat to the ending point Ga2, and a trajectory Tra2 is generated such that the point Sb2 which is a current position of the robot arm 6 is avoided in the trajectory generation illustrated in FIG. 9B. Furthermore, as illustrated in FIG. 16E, a passing (sweeping) region (SVa2) of the robot arm 6 moving along the trajectory Tra2 is added to the obstacle memory 2201 as an obstacle.

Figure 9C:
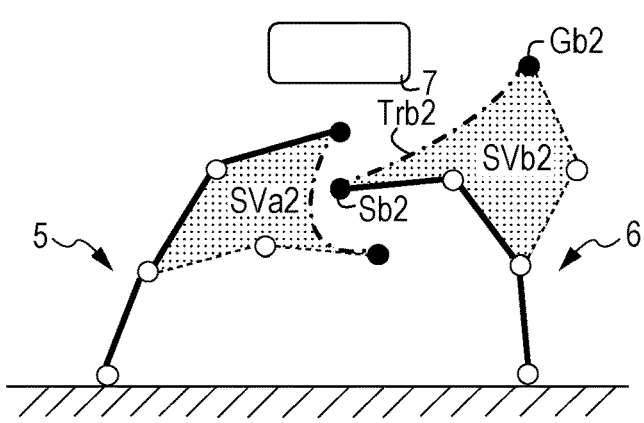
Figure 9D:
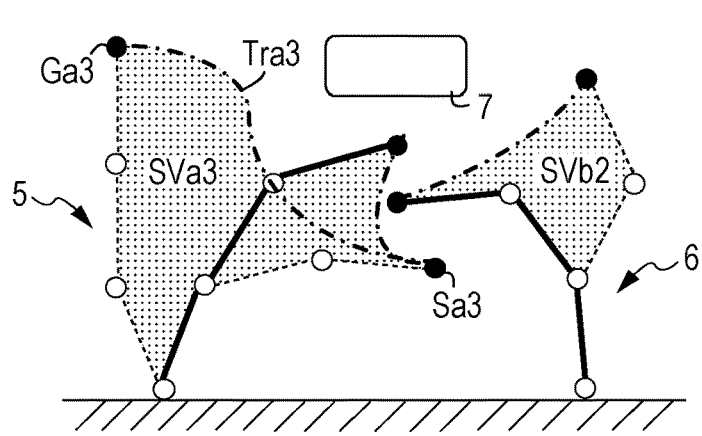

In step S330 to step S360 of FIG. 7, the subsequent operation instructions Mb2, Ma3, and so on are processed. A trajectory Trb2 is generated for the starting point Sb2 and the ending point Gb2 of the operation instruction Mb2 such that the trajectory Trb2 avoids the added obstacle SVa2 (FIG. 9C). Furthermore, an obstacle (SVb2) corresponding to a passing (sweeping) region of the trajectory Trb2 is generated and the obstacle (SVb2) is added to the obstacle memory 2201 (FIG. 16F). Finally, a trajectory Tra3 is generated for the starting point Sa3 and the ending point Ga3 of the operation instruction Ma3 (FIG. 9D), and an obstacle (SVa3) corresponding to a passing (sweeping) region of the trajectory Tra3 is generated.

In this way, generation of all the trajectories corresponding to all the operation instructions in the operation instruction list which is inputted first by the operator is completed. According to the trajectory generation method of this embodiment, in a case where the trajectory generation is not available due to an obstacle corresponding to a passing (sweeping) region of an arm, the operation instruction list is divided into a first operation instruction including processed operation instructions and a second operation instruction including unprocessed operation instructions. In this case, the remaining second operation instruction is processed after obstacle data in the obstacle memory is cleared, and therefore, the trajectory generation (and the obstacle registration) may be continuously performed.

On the other hand, according to the trajectory generation described above, in an operation in the real environment, the robot arms corresponding to the divided operation instructions Op1-1 and Op1-2 may interfere with each other, and therefore, the synchronization execution control is to be executed. For example, after all the operations in the first operation instruction Op1-1 are terminated, control for executing operations in the second operation instruction Op1-2 is performed. Therefore, when the operation instruction is divided as described above, the CPU 20 inserts the synchronization instruction ("Sp1" of FIG. 10) in a position where the synchronization control is to be performed in the trajectory data.

FIG. 10 is a diagram illustrating a timing when the robot operations corresponding to the (first) operation instruction Op1-1 and the (second) operation instruction Op1-2 obtained by the division described above are synchronously executed by the robot arms 5 and 6. This example corresponds to the (first) operation instruction Op1-1 and the (second) operation instruction Op1-2 described with reference to FIGS. 8A to 8D and FIGS. 9A to 9D. By this, when the division into the (first) operation instruction Op1-1 and the (second) operation instruction Op1-2 is performed, the CPU 20 inserts the synchronization instruction (Sp1) into the trajectory data. By this, the synchronized control may be performed such that the operation corresponding to the (second) operation instruction Op1-2 is started after all the operations corresponding to the operation instruction Op1-1 is terminated.

In FIG. 10, first, the two robot arms 5 and 6 simultaneously start respective operations. In this case, although one of the robot arms terminates its operation, when the synchronization instruction (Sp1) has been inserted, an operation of a next instruction is not executed until an operation of another robot arm is completed. In the example of FIG. 10, although the robot arm 6 completes the operation (Mb1) first, the synchronization control is performed such that the robot arm 6 waits for a waiting time 80 until the operation instruction Ma1 of the robot arm 5 is completed. After all the operations in the operation instruction Op1-1 is completed, the next operation instruction Op1-2 is processed, and the operations (Ma2, Mb2, Ma3, and so on) are simultaneously executed.

Note that if the division of an operation instruction (and the clearance of the obstacle memory 2201) occurs between the operation instruction Op1-2 and a subsequent operation instruction (not illustrated), a synchronization instruction (Sp2) is inserted as illustrated in FIG. 10. Although the robot arm 6 completes all the operations first in this embodiment, the synchronization control is performed for waiting for the robot arm 5 for a period of time corresponding to the waiting time 90.

As described above, according to this embodiment, the instructions after the division secures the trajectories of the plurality of robot arms which do not interfere with each other, and if interference occurs between the instructions, the robot arms are synchronously operated in accordance with a synchronization instruction. By this, according to this embodiment, even in a case where a large number of operations are assigned to a robot arm, a synchronization instruction is issued and simple synchronization control is performed in the real environment so that trajectories in which robots do not interfere with each other may be automatically generated.

Figure 18:
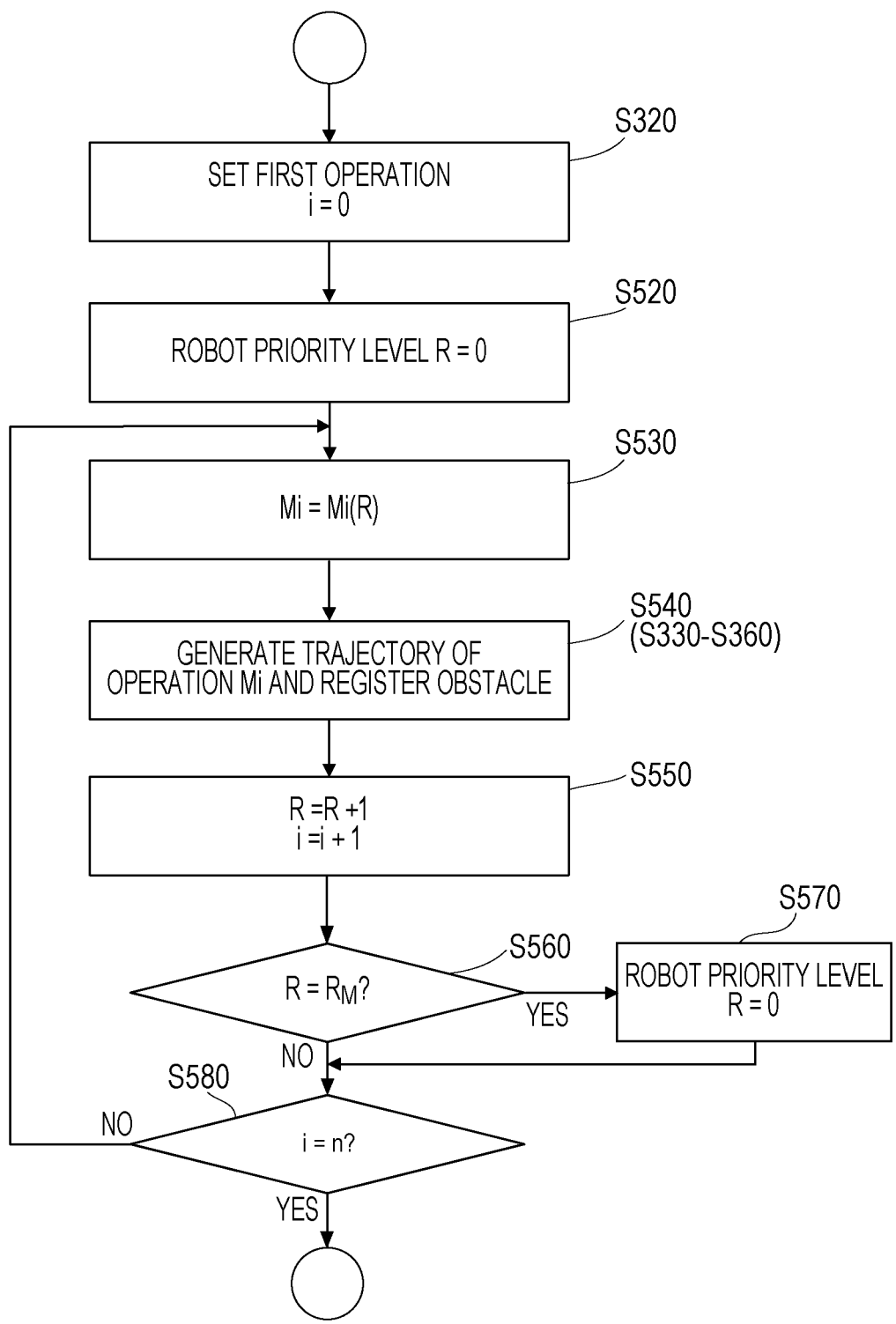
FIG. 18 is a flowchart illustrating a main section of the trajectory generation control according to the first to third embodiments.

Here, FIG. 18 is a diagram illustrating an algorithm of control of processing order of the trajectory generation (and the obstacle registration) using priority levels for individual robot arms and individual operation instructions associated with the process in step S310 in FIG. 7 (and step S210 of FIG. 5).

Here, a pointer (counter) R indicating a priority level for each robot arm is used. The pointer (counter) R is incremented by 1 from a value 0 corresponding to a largest priority level to $R_M$ corresponding to the maximum (total) number of robot arms. Meanwhile, identification data of the robot arms is successively stored in a robot arm priority list secured in a main memory or a virtual memory indicated by the pointer (counter) R in the descending order of priority in accordance with a user's (operator's) designation (or the CPU 20 automatically determines the order). This robot arm priority list is referred to from a leading portion (0) based on a value of the pointer (counter) R so that the CPU 20 may execute the trajectory generation (and the obstacle registration) in order of arms defined in the robot arm priority list. Note that the pointer (counter) R is cyclically used in the example of FIG. 18, and when the value of the pointer (counter) R reaches $R_M$ corresponding to the maximum (total) number of robot arms, the value is reset to 0.

Furthermore, although the priority level control performed for each operation instruction using the pointer (counter) i is not described in detail hereinabove, the same configuration described above may be employed in the priority level control performed for each operation instruction. For example, identification data of the individual operation instructions are successively stored in the descending order of the priority in accordance with a user's (operator's) designation (or the CPU 20 automatically determines the order) in an operation instruction priority list secured in the main memory or the virtual memory instructed by the pointer (counter) i. The operation instructions may be processed in order of definitions in the operation instruction priority list by referring to the operation instruction priority list in accordance with the value of the pointer (counter) i (the highest priority level is 0).

FIG. 18 is a flowchart illustrating a portion from step S320 to step S370 of FIG. 7 in detail, and a process of initializing the pointer (counter) i (i=0) which is the same as the flowchart of FIG. 7 is performed in step S320. A process of initializing the pointer (counter) R described above (R=0) is performed in subsequent step S520.

In step S530, an operation instruction to be processed is determined by a pointer (counter) calculation represented by "Mi=Mi(R)", for example. Specifically, the pointer (counter) operation is a process of specifying an (unprocessed) operation instruction currently having the highest priority level of a robot arm indicated by the pointer (counter) R.

In step S540, the trajectory generation and the obstacle registration process corresponding to the process from step S330 to step S360 of FIG. 7 are performed. Although not illustrated in detail, the operation instruction division process in step S340 and step S380 may be similarly performed when the trajectory generation is unavailable.

In step S550, the pointer (counter) R and the pointer (counter) i are incremented by 1 (R=R+1 and i=i+1). By this, the pointers (counters) R and i are individually incremented so that the robot designation and the operation instruction indicate a next robot arm and a next operation instruction, respectively.

In step S560, it is determined whether the pointer (counter) R reaches the maximum number, that is, $R_M$ representing the maximum (total) number of robot arms. When the determination is affirmative in step S560, the pointer (counter) R is reset to 0 so as to indicate an arm which has the highest priority level and which has been processed first.

A process in step S580 is the same as that performed in step S370 of FIG. 7, and it is determined whether all the operation instructions in the operation instruction list have been processed by checking a value of the pointer (counter) i. If at least one of the operation instructions has not been processed, the process returns to step S530 and the operation described above is performed again.

In the priority level process illustrated in FIG. 18, by incrementing the pointer (counter) R, all the robot arms may be specified in turn in order of the priority levels and the operation instructions may be extracted to be processed in turn in the order of the priority levels using the pointer (counter) i. Accordingly, in the priority order control performed for each robot arm, the operation instructions of all the robot arms may be processed in turn in the order of set priority levels based on the priority order. Accordingly, a situation in which the priority order of the robots specified by the user (the operator) is biased, and therefore, an operation of only a certain robot arm is processed first and trajectory generation is not performed due to processes of operations of subsequent robot arms may be avoided.

Third Embodiment

In the second embodiment, as the situation in which the trajectory generation is unavailable, the case where the ending point of the trajectory generation (the same is true to the starting point) interfere with the obstacle (SVb1) generated by the trajectory generation of the other robot arm from the beginning is illustrated in FIG. 8D. In a third embodiment, a processing method which avoids such a situation will be described. In this embodiment, a basic configuration of a trajectory generation system illustrated in FIGS. 1, 2, 3, 4, and 14 are the same as those of the first and second embodiments described above. Possible redundant descriptions of the members and the control operations which have been described above are omitted.

In the third embodiment, the problem described above is avoided by registering spaces of structures of the arms in orientations at times when the robot arms are positioned in the starting points and the ending points of the trajectory definitions in the operation instructions as obstacles. By this, a situation in which a starting point or an ending point of a certain operation instruction is included in a passing region of another robot arm from the beginning may be avoided.

Figure 12:
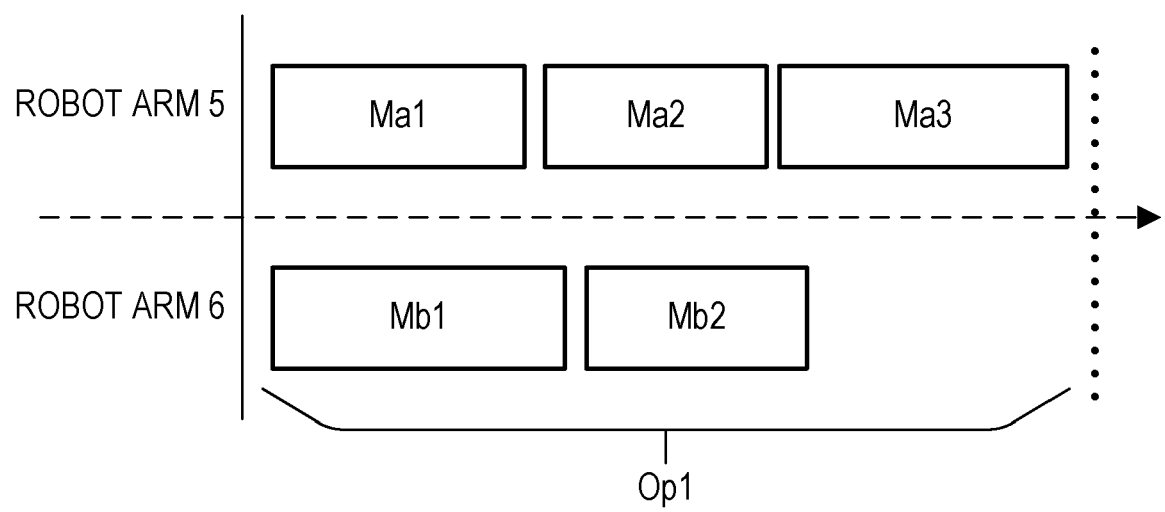
FIG. 12 is a diagram illustrating timings of operations of the two robot arms according to the third embodiment.
Figure 13:
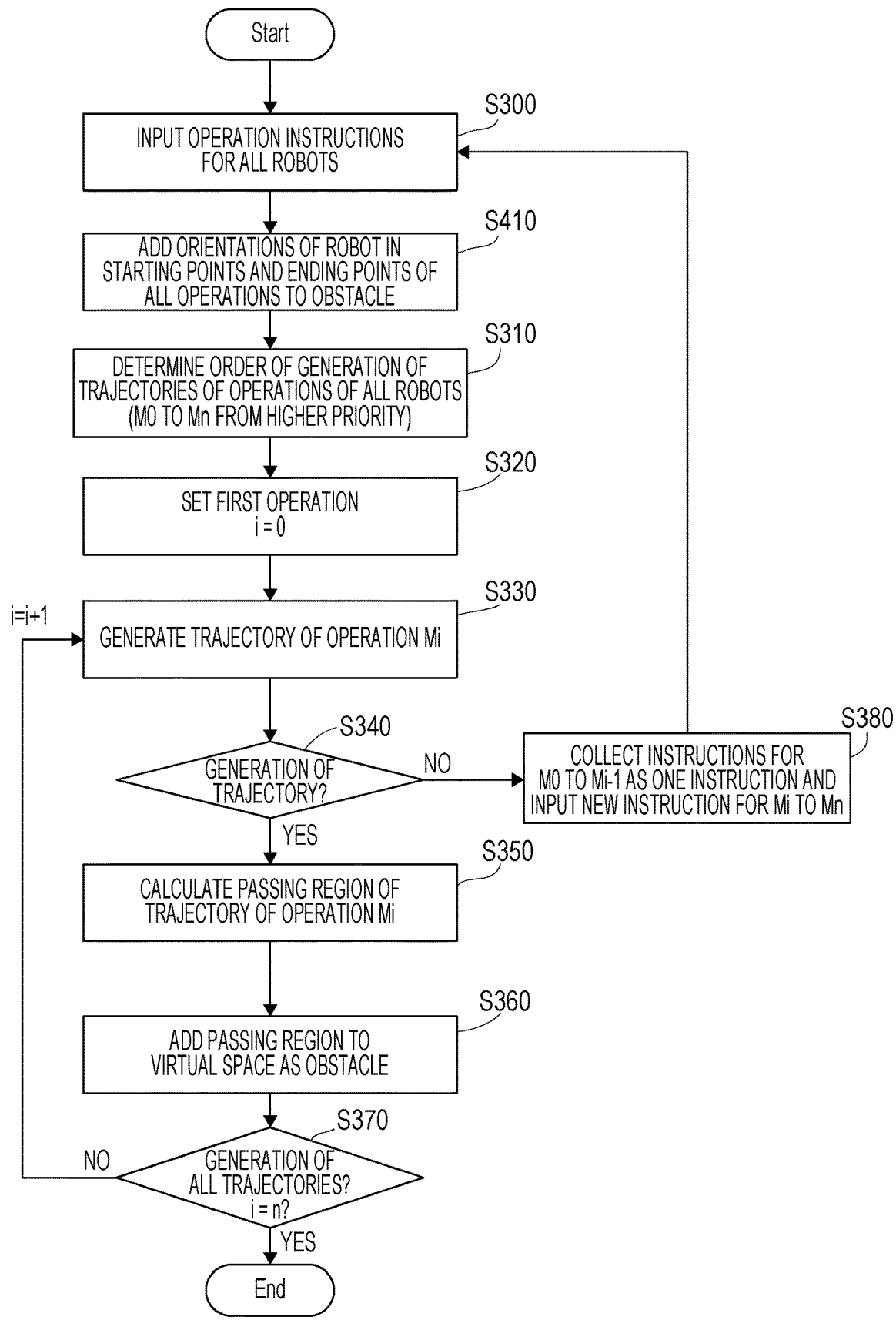
FIG. 13 is a flowchart illustrating the trajectory generation control according to the third embodiment.

Hereinafter, a method for generating trajectories so that passing regions of a plurality of robots do not overlap with each other according to the third embodiment will be described using a processing method of this embodiment with reference to FIGS. 11A to 11F, FIG. 12, FIG. 13, and FIGS. 17A to 17F. FIGS. 11A to 11F are diagrams illustrating orientations of the robot arms (5 and 6) and states of the trajectory generation (and the obstacle registration) in a form the same as that of FIGS. 8A to 8D. FIG. 12 is a diagram illustrating a state of synchronized robot control in the real environment corresponding to FIG. 10 of the second embodiment. FIG. 13 is a flowchart illustrating a control procedure of the trajectory generation (and the obstacle registration) according to this embodiment in a format the same as that of FIG. 7. FIGS. 17A to 17F are diagrams illustrating transition of data content of an obstacle memory 2201 of this embodiment in a form equivalent to those of FIGS. 15A to 15C and FIGS. 16A to 16F.

Hereinafter, a configuration and operation instructions included in an operation instruction list to be processed are the same as those of the second embodiment. Therefore, portions different from the second embodiment are mainly described hereinafter.

In this embodiment, the operation instruction list generated in accordance with input by the operator is the same as that of the second embodiment and is configured by operation instructions described below.
Op1={Ma1, Ma2, Ma3, Mb1, Mb2}
Ma1=(Sa1, Ga1), Mb1=(Sa1, Ga1), Ma2=(Sa2, Ga2), Mb2=(Sb2, Gb2), Ma3=(Sa3, Ga3)

Positions of starting points and ending points described above are illustrated in FIG. 11A.

FIG. 13 is a flowchart of a trajectory generation (and obstacle registration) process according to this embodiment. In FIG. 13, processing steps the same as those of FIG. 7 of the second embodiment are denoted by step numbers the same as those of FIG. 7. FIG. 13 is different from FIG. 7 in that step S410 is inserted between step S300 and step S310. Processes in the other steps are the same as those described with reference to FIG. 7.

In step S410 of FIG. 13, before generation of all trajectories is started, spaces of structures of the arms in orientations at times when the robot arms are positioned in starting points and ending points included in the operation instructions are registered in the obstacle memory 2201 as obstacles. FIG. 17A is a diagram illustrating a state after the process in step S410 is executed. Specifically, in FIG. 17A, regions of the structures of the arms in orientations in the starting points (Sa1, Sa2, and so on and Sa1, Sb2, and so on) and the ending points (Ga1, Ga2, and so on and Ga1, Gb2, and so on) of the operation instructions described above are registered in the obstacle memory 2201 as obstacles.

A successive flow of the process is the same as that illustrated in FIG. 7. For example, a method for determining priority order of processes employed in step S310 may be performed similarly to the second embodiment, and the processing order of operation instruction Op1 is determined as follows: Ma1, Ma2, Ma3, Mb2, and Mb2.

After initialization in step S320, the trajectory generation and the obstacle addition process are performed in a loop from step S330 to step S370 (and step S380) in accordance with the set order. Here, in the initial registration state of the obstacle as illustrated in FIG. 17A, trajectories are generated such that positions of starting points and ending points of arms other than the arm being processed are avoided in the trajectory generation (step S330) in this embodiment.

Figure 11A:
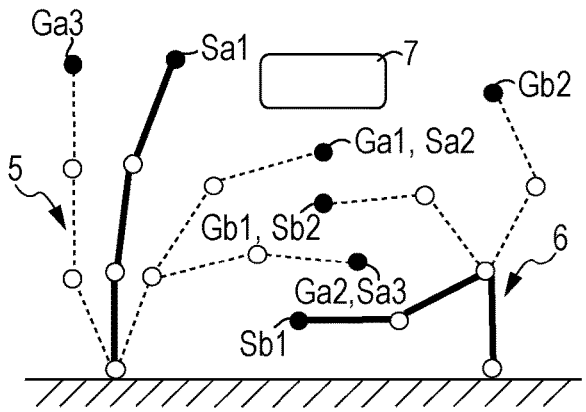
FIGS. 11A to 11F are diagrams illustrating trajectories and passing regions of two robot arms according to the third embodiment.
Figure 11B:
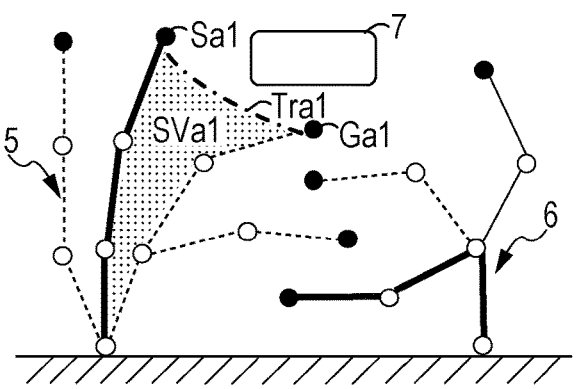

A state of the trajectory generation and the obstacle additional registration is illustrated in FIGS. 11A to 11F and FIGS. 17B to 17F, respectively, for example. Here, a trajectory Tra1 is generated such that the trajectory Tra1 avoids an obstacle 7 arranged in advance at a time of trajectory generation corresponding to an operation instruction Ma1, and a sweeping (passing) region is added to the obstacle memory 2201 as an obstacle (SVa1) (FIGS. 11B and 17B).

Figure 11C:
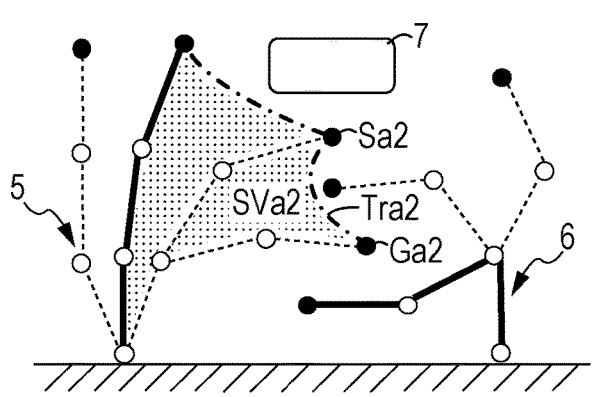

Subsequently, a trajectory Tra2 is generated such that the trajectory Tra2 avoids the position of the ending point Ga1 (the starting point Sb2) of the robot arm 6 which has been registered as an obstacle (FIG. 11C). Furthermore, a sweeping (passing) region of the robot arm 6 corresponding to the trajectory Tra2 is added to the obstacle memory 2201 as an obstacle (SVa2) (FIG. 17C). By this, unlike the control in the second embodiment, generation of a trajectory of the subsequent operation instruction Mb1 is prevented from becoming unavailable.

Figure 11D:
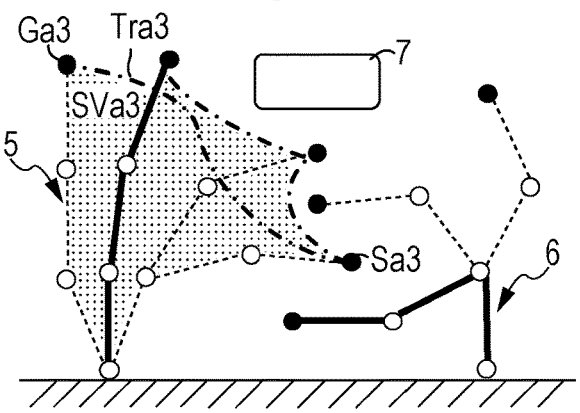

Furthermore, a trajectory Tra3 corresponding to the operation instruction Ma3 is similarly generated such that the trajectory Tra3 avoids the position of the ending point Ga1 (the starting point Sb2) of the robot arm 6, and a passing (sweeping) region is added to the obstacle memory 2201 as an obstacle (SVa3) (FIGS. 11D and 17D).

Figure 11E:
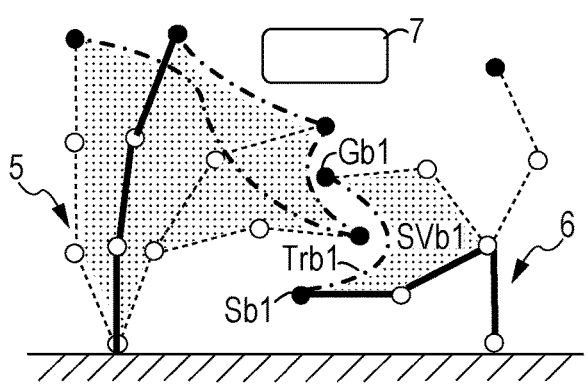
Figure 11F:
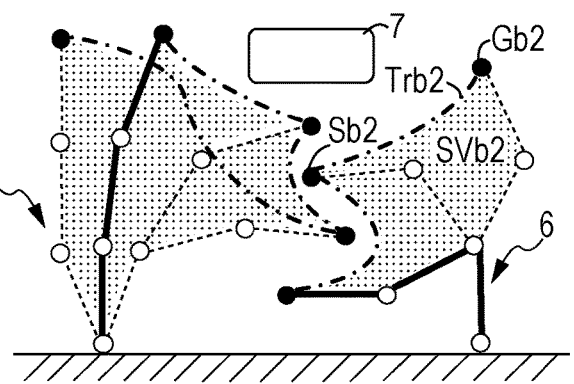

Furthermore, when a trajectory of the robot arm 6 is subsequently generated, as with the second embodiment, trajectory generation is performed such that the trajectory avoids the passing region added in the preceding procedure. This is because the passing region includes starting points and ending points of another robot arm. Accordingly, in the trajectory generation for the robot arm 6, a trajectory Trb1 corresponding to the operation instruction Mb1 is generated first and a sweeping (passing) region is added to the obstacle memory 2201 as an obstacle (SVb1) (FIGS. 11E and 17E). Thereafter, a trajectory Trb2 (FIG. 11F) corresponding to the operation instruction Mb2 is generated, and a corresponding passing region is added to the obstacle memory 2201 as an obstacle (SVb2) (FIG. 17F).

In this way, the generation of trajectories for all operations assigned as the operation instruction Op1 is completed. FIG. 12 is a time chart obtained when the two robot arms 5 and 6 which have been subjected to the trajectory generation as described above are operated. In a case of the operation instruction Op1 described above, since spaces corresponding to orientations of the arm structures in a starting point and an ending point of an operation instruction are registered as obstacles before start of the trajectory generation, the branching in step S340 to step S380 of FIG. 13 does not occur. Therefore, the synchronization control illustrated in FIG. 10 is not to be performed, and even if the robot arms 5 and 6 simultaneously start operations and execute trajectory generation of assigned operations irrespective of robot arm operation, the robot arms 5 and 6 do not interfere with each other.

Specifically, according to the third embodiment, spaces corresponding to orientations of arm structures having starting points and ending points in operation instructions are registered as obstacles in advance (as sort of determined obstacles), and trajectory correction is performed such that the obstacles are avoided. Accordingly, possibility of execution of division of an operation instruction illustrated in the second embodiment, clearance of obstacle data, and generation of a synchronization instruction to be used to synchronously control arm operations in the real environment is reduced, and trajectory generation in which the arms do not interfere with each other may be smoothly performed. Even in a case where a robot arm is operated using trajectory data generated in the real environment, possibility of need of the synchronization control illustrated in the second embodiment may be reduced and the robot arms may be operated at high speed.

The detailed configurations in the foregoing embodiments are merely examples, and do not limit claims. Techniques described in claims include a technique obtained by deforming and changing the detailed examples illustrated above in various ways, and those skilled in the art may naturally perform various design changes within the scope of claims.

The present invention may be realized by supplying a program which realizes at least one of the functions in the foregoing embodiments to a system or an apparatus through a network or a storage medium and reading and executing the program using at least one processor included in a computer of the system or the apparatus. Furthermore, the present invention may be realized by a circuit which realizes at least one function (an application specific integrated circuit (ASIC), for example).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments.

What is claimed is:

1. A control method implemented in a control device configured to obtain, based on first trajectory definition data and second trajectory definition data, a first trajectory along which a first robot arm operates and a second trajectory along which a second robot arm operates, comprising:

obtaining, by the control device, based on the first trajectory definition data, space data corresponding to a space through which the first robot arm passes and through which the second robot arm is required to avoid passing; and when the control device obtains the second trajectory along which the second robot arm operates while avoiding the space corresponding to the space data based on the space data and the second trajectory definition data, in a case where the space is not avoidable at a predetermined portion of the second trajectory definition data, clearing the space data, and obtaining a new first trajectory and a new second trajectory based on the second trajectory definition data corresponding to the predetermined portion and based on the first trajectory definition data.

2. The control method according to claim 1, further comprising:
transmitting the new first trajectory to the first robot arm, and transmitting the new second trajectory to the second robot arm.

3. The control method according to claim 1, wherein the space data contains information regarding an obstacle that exists in an operable area of the first robot arm and the second robot arm.

4. The control method according to claim 1, further comprising:
setting a sequential order of operations of the first robot arm and the second robot arm.

5. The control method according to claim 1, further comprising:
displaying, on a display device, an image corresponding to the first robot arm and the second robot arm arranged in a virtual space.

6. The control method according to claim 5, further comprising:
making a first starting point and a first ending point of the first robot arm and a second starting point and a second ending point of the second robot arm settable by operating the first robot arm and the second robot arm displayed in the virtual space.

7. A non-transitory computer-readable storage medium that stores a control program that causes the control device to execute each process recited in claim 1.

8. A manufacturing method for manufacturing a product on a basis of the new first trajectory and the new second trajectory generated by the control device using the control method recited in claim 1.

9. The control method according to claim 1,
wherein, in obtaining the new first trajectory and the new second trajectory, new space data is obtained based on the second trajectory definition data corresponding to the predetermined portion, and the new first trajectory and the new second trajectory are obtained based on the second trajectory definition data corresponding to the predetermined portion, the first trajectory definition data, and the new space data.

10. The control method according to claim 9,
wherein, in obtaining the new first trajectory, the new first trajectory is obtained based on the first trajectory definition data such that the first robot arm avoids passing through a space corresponding to the new space data.

11. The control method according to claim 1,
wherein, in obtaining the new first trajectory and the new second trajectory, the second trajectory definition data is divided into a first part in which interference between the first robot arm and the second robot arm has already been avoided and a second part in which the interference has not been avoided.

12. The control method according to claim 11,
wherein, in obtaining the new first trajectory and the new second trajectory, the space data is cleared, new space data is obtained based on the second part in the second trajectory definition data, and the new first trajectory and the new second trajectory are obtained based on the second trajectory definition data corresponding to the predetermined portion, the first trajectory definition data, and the new space data.

13. A control device configured to obtain, based on first trajectory definition data and second trajectory definition data, a first trajectory along which a first robot arm operates and a second trajectory along which a second robot arm operates, comprising:
at least one processor and at least one memory coupled to the at least one processor and having stored thereon instructions configured to be executed by the at least one processor, the at least one processor and the at least one memory cooperating to:
obtain, based on the first trajectory definition data, space data corresponding to a space through which the first robot arm passes and through which the second robot arm is required to avoid passing; and
when the second trajectory along which the second robot arm operates while avoiding the space corresponding to the space data is obtained based on the space data and the second trajectory definition data, in a case where the space is not avoidable at a predetermined portion of the second trajectory definition data, clear the space data, and obtain a new first trajectory and a new second trajectory based on the second trajectory definition data corresponding to the predetermined portion and based on the first trajectory definition data.

14. The control device according to claim 13, the at least one processor and the at least one memory further cooperating to:
transmit the new first trajectory to the first robot arm, and transmit the new second trajectory to the second robot arm.

15. The control device according to claim 13, wherein the first space data contains information regarding an obstacle that exists in an operable area of the first robot arm and the second robot arm.

16. The control device according to claim 13, the at least one processor and the at least one memory further cooperating to:
set a sequential order of operations of the first robot arm and the second robot arm.

17. The control device according to claim 13, the at least one processor and the at least one memory further cooperating to:
display, on a display device, an image corresponding to the first robot arm and the second robot arm arranged in a virtual space.

18. The control device according to claim 17, the at least one processor and the at least one memory further cooperating to:
make a first starting point and a first ending point of the first robot arm and a second starting point and a second ending point of the second robot arm settable by operating the first robot arm and the second robot arm displayed in the virtual space.

* * * * *